United States Patent
Ishii

(10) Patent No.: US 10,222,916 B2
(45) Date of Patent: Mar. 5, 2019

(54) DEVICE AND METHOD FOR SELF-CAPACITANCE TOUCH SENSING

(71) Applicant: Synaptics Japan GK, Tokyo (JP)

(72) Inventor: Tatsuya Ishii, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 34 days.

(21) Appl. No.: 15/425,150

(22) Filed: Feb. 6, 2017

(65) Prior Publication Data

US 2017/0235392 A1 Aug. 17, 2017

(30) Foreign Application Priority Data

Feb. 15, 2016 (JP) .................................. 2016-025948

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/044; G06F 3/0412; G06F 3/0416
See application file for complete search history.

(56) References Cited

U.S. PATENT DOCUMENTS

| 2014/0145985 | A1 | 5/2014 | Akai et al. |
| 2014/0210776 | A1* | 7/2014 | Kuroiwa ............... G06F 3/0416 345/174 |
| 2014/0313146 | A1 | 10/2014 | Munechika |
| 2016/0216836 | A1* | 7/2016 | Yao ....................... G06F 3/0418 |
| 2016/0224177 | A1* | 8/2016 | Krah ...................... G06F 3/0416 |
| 2017/0090619 | A1* | 3/2017 | Yousefpor ............... G06F 3/044 |

* cited by examiner

*Primary Examiner* — Amit Chatly
(74) *Attorney, Agent, or Firm* — Patterson + Sheridan, LLP

(57) ABSTRACT

A touch panel device includes a touch panel including sensing electrodes, a selector circuitry; a sensing circuitry configured to generate sensed signals having signal levels depending on self-capacitances of connected ones of the sensing electrodes, and a processor configured to perform touch sensing of the touch panel, based on the sensed signals. When the touch panel device is placed in a first state, the selector circuitry electrically connects first sensing electrodes to the sensing circuitry in each operation cycle. When the touch panel device is placed in a second state, the selector circuitry electrically connects second sensing electrodes to the sensing circuitry in each operation cycle. The number of the second sensing electrodes connected to the sensing circuitry in each operation cycle for the second state is less than the number of the first sensing electrodes connected to the sensing circuitry in each operation cycle for the first state.

18 Claims, 23 Drawing Sheets

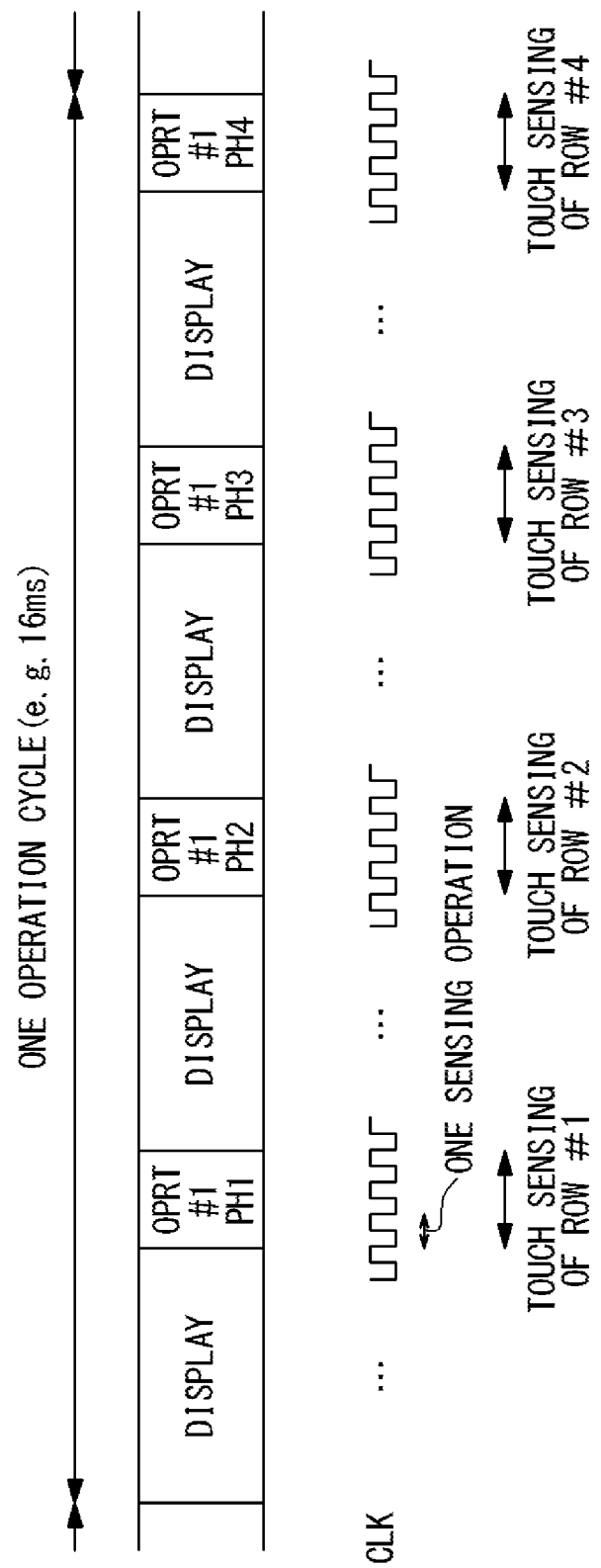

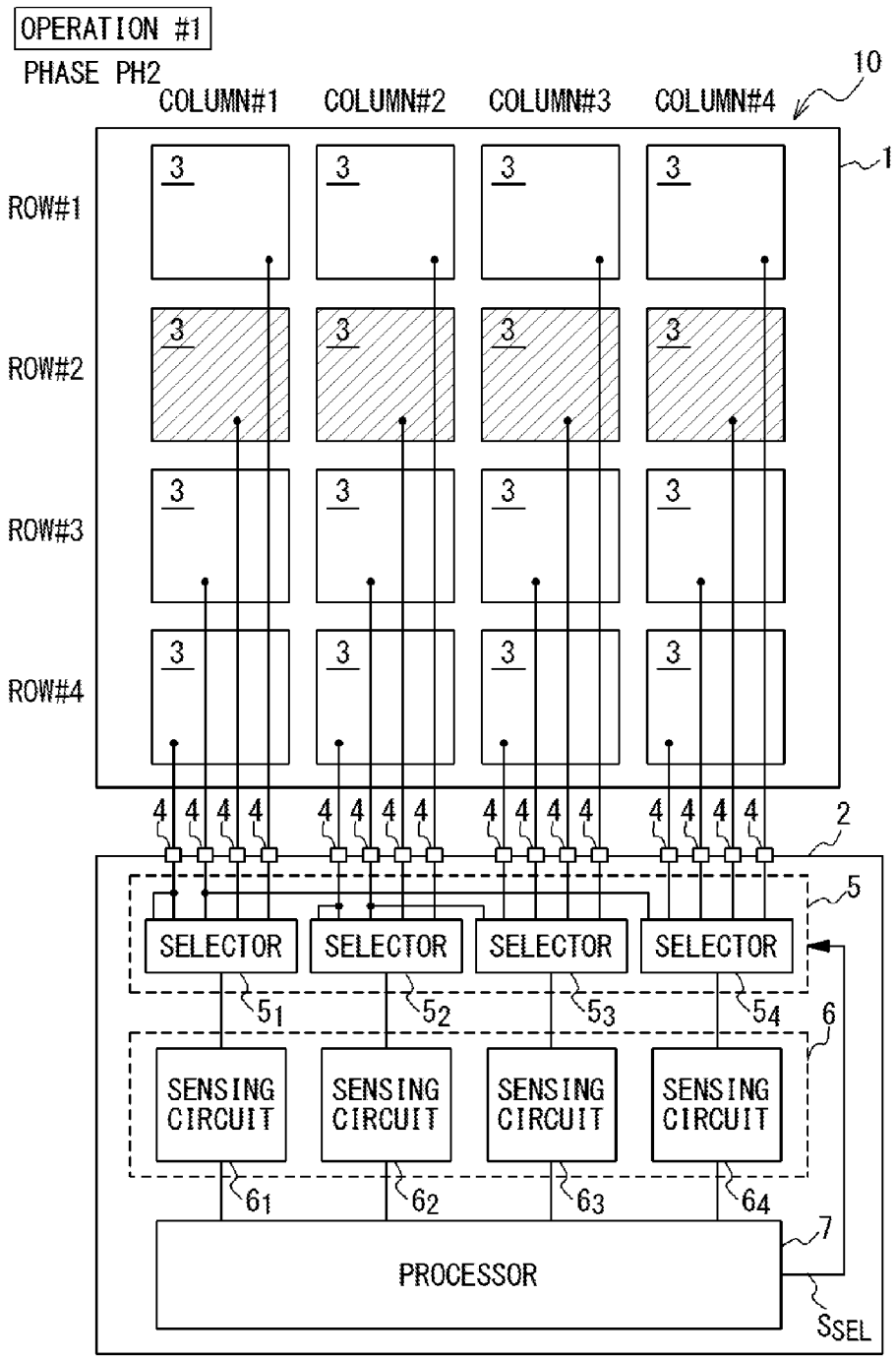

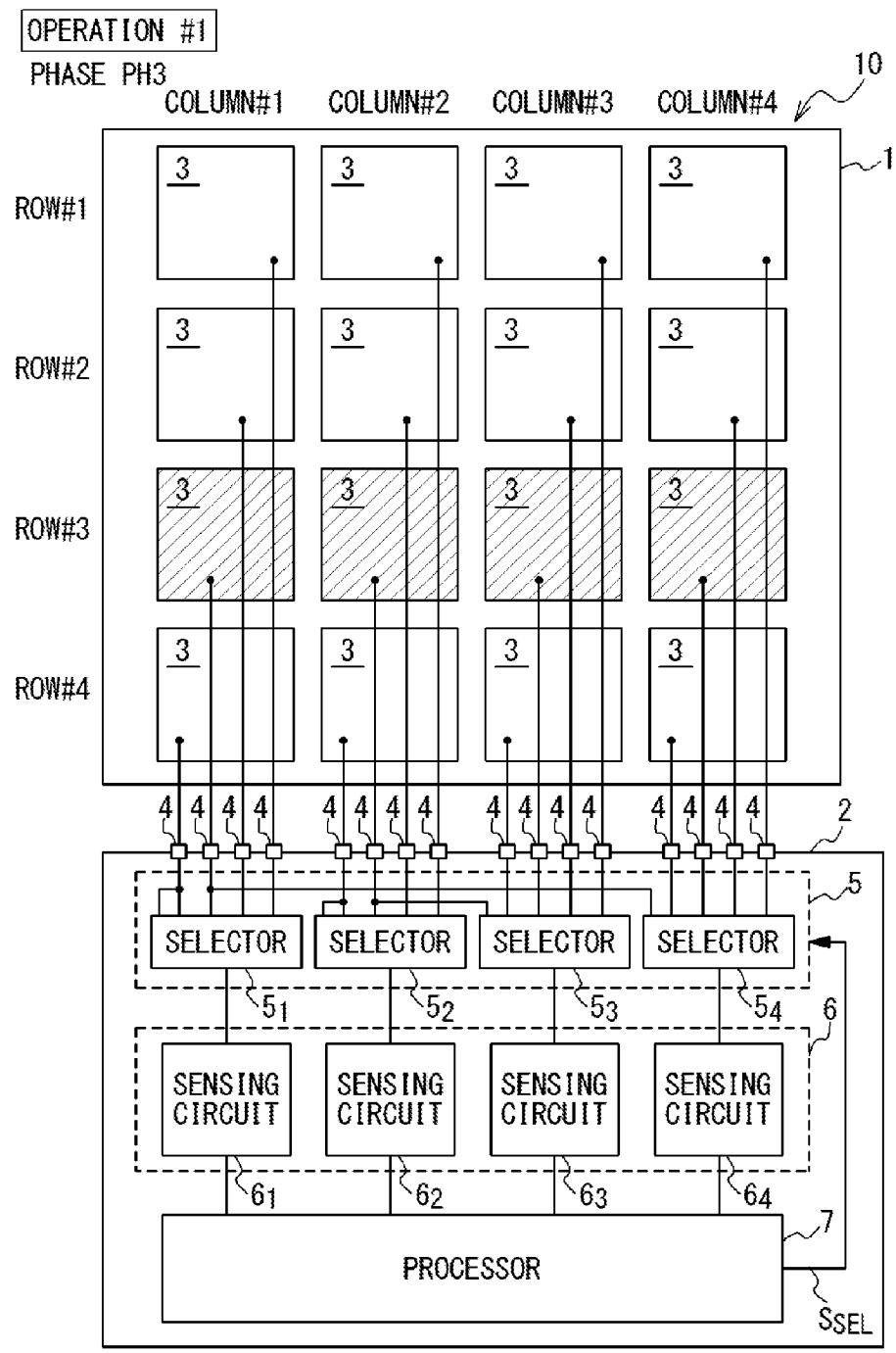

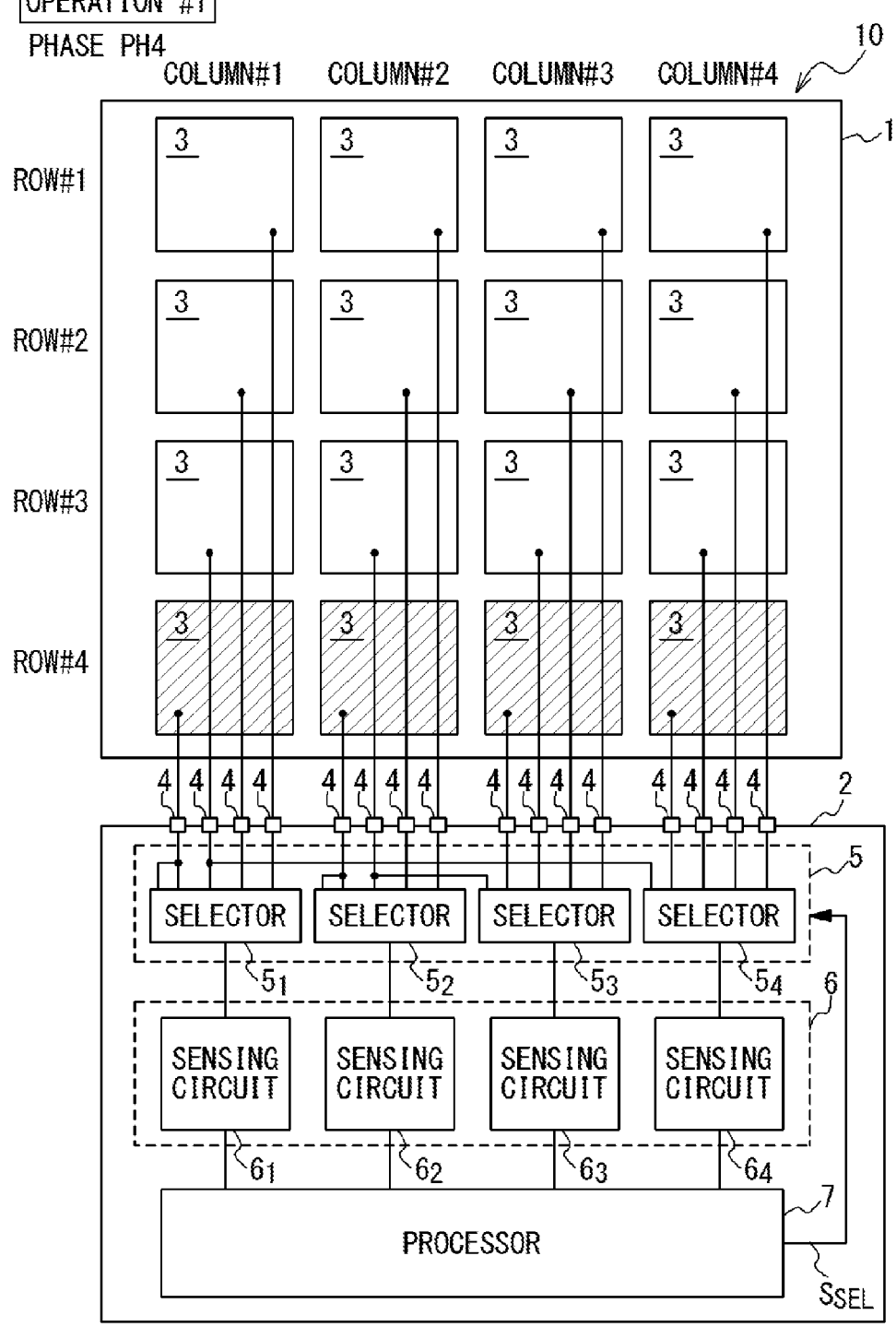

Fig. 8

| DISPLAY | OPRT #2 PH1 | DISPLAY | OPRT #2 PH2 | DISPLAY | OPRT #2 PH1 | DISPLAY | OPRT #2 PH2 |

ONE OPERATION CYCLE (e.g. 16ms)

CLK

TOUCH SENSING OF SELECTED AREA — ONE SENSING OPERATION — TOUCH SENSING OF SELECTED AREA — TOUCH SENSING OF SELECTED AREA — TOUCH SENSING OF SELECTED AREA

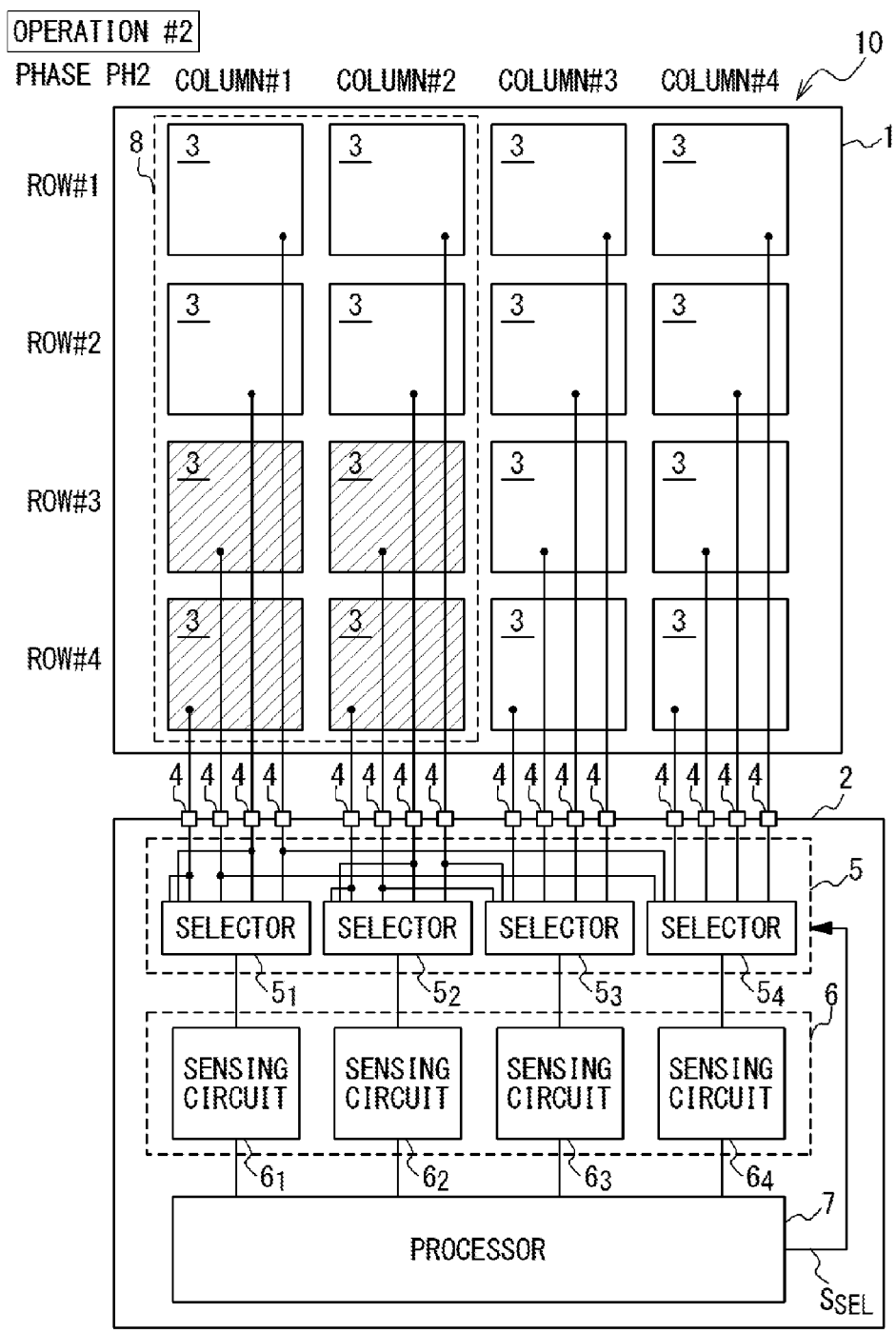

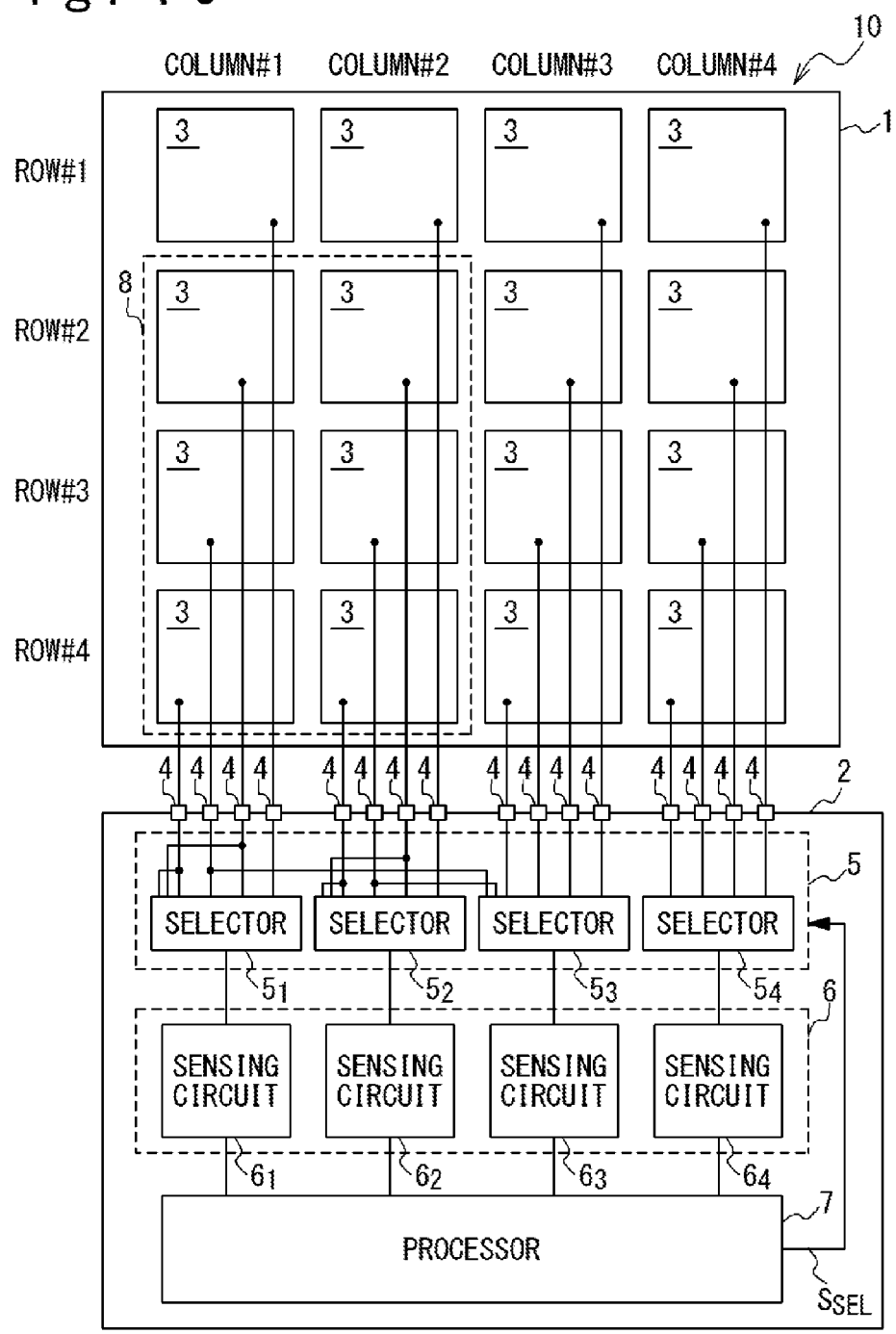

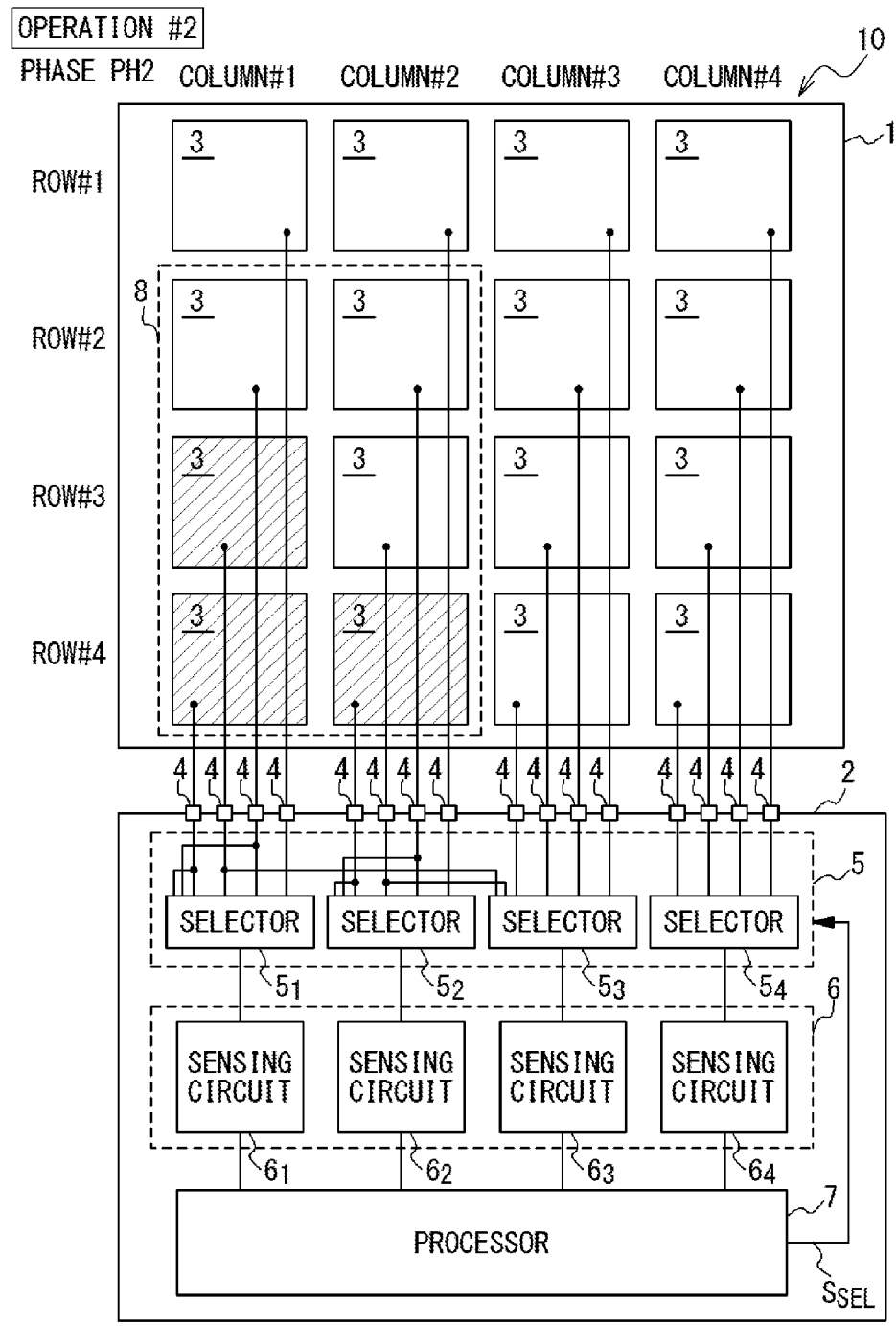

PARTIAL TOUCH SENSING
(HIGH SENSITIVITY)

FULL SCREEN TOUCH SENSING
(LOW SENSITIVITY)

PARTIAL TOUCH SENSING
(HIGH SENSITIVITY)

FULL SCREEN TOUCH SENSING
(LOW SENSITIVITY)

PARTIAL TOUCH SENSING
(HIGH SENSITIVITY)

DEVICE AND METHOD FOR SELF-CAPACITANCE TOUCH SENSING

CROSS REFERENCE

This application claims priority of Japanese Patent Application No. 2016-025948, filed on Feb. 15, 2016, the disclosure which is incorporated herein by reference.

TECHNICAL FIELD

The present invention relates to a touch panel device, touch controller and touch sensing method, more particularly, to self-capacitance touch sensing.

BACKGROUND ART

Touch sensing, which involves sensing a contact of an object such as a human body and a stylus with a touch panel, is one of important technologies in a touch panel device.

One known method of touch sensing is a projected capacitive touch technology, which senses changes in static capacitances of sensing electrodes formed in a touch panel. The projected capacitive touch technology includes mutual-capacitance touch sensing and self-capacitance touch sensing.

The mutual-capacitance touch sensing is a touch sensing method which involves sensing mutual capacitances formed between drive electrodes and sensing electrodes provided in the touch panel. For example, Japanese Patent Application Publication No. 2014-106866 A discloses a mutual-capacitance touch sensing technology.

The self-capacitance touch sensing is, on the other hand, a touch sensing method which involves sensing self-capacitances of sensing electrodes. More specifically, self-capacitance touch sensing senses the self-capacitance of each sensing electrode, which is the sum of the capacitance formed between each sensing electrode and the circuit ground and the capacitance formed between each sensing electrode and a conductor (e.g. as a human body) located near each sensing electrode. Since an increase in the self-capacitance of a sensing electrode implies that a conductor is located near the sensing electrode, touch sensing can be achieved by sensing the self-capacitance of each sensing electrode.

Generally speaking, the self-capacitance touch sensing is not considered as being suitable for multi-touch sensing (that is, sensing of simultaneous touching at multiple positions of a touch panel), and therefore is not considered as being suitable for an application which requires multi-touch sensing, such as touch sensing of a touch panel mounted in a panel display device. According to a study by the inventor, however, multi-touch sensing can be achieved in a self-capacitance touch sensing technology by using an appropriately-configured touch panel and touch controller. According to the study by the inventor, the self-capacitance touch sensing technology is rather advantageous for reducing the volume of a user interface device including a display panel (such as a liquid crystal display panel) and a touch panel, because integration of a display panel and a touch panel is easier in the self-capacitance touch sensing technology.

One requirement of a touch panel device using self-capacitance touch sensing is improvement in the sensitivity of touch sensing. For example, a high sensitivity is desired especially when a touch panel device is operated with a stylus or a glove. Current technologies, however, do not achieve a sufficient sensitivity in self-capacitance touch sensing.

Another requirement of a touch panel device using self-capacitance touch sensing is power consumption reduction. Power consumption reduction can be especially significant when the touch panel device is installed in a mobile terminal which includes a battery as the power supply.

Japanese Patent Application Publication No. 2014-211850 A discloses a technique for improving a touch sensing performance with respect to a touch panel device which performs mutual capacitance touch sensing. It should be noted however that the technique for improving the touch sensing performance, which is used in the mutual capacitance touch sensing, cannot be applied to self-capacitance touch sensing, because the circuit configuration and the touch sensing principle are completely different between mutual capacitance touch sensing and self-capacitance touch sensing.

SUMMARY OF INVENTION

Therefore, non-limiting objectives of the present disclosure is to achieve at least one of improvement in the touch sensing sensitivity and reduction in power consumption. Other objectives and new features of the present disclosure would be understood by a person skilled in the art from the following disclosure.

In one embodiment, a touch panel device includes a touch panel including a plurality of sensing electrodes; a selector circuitry; a sensing circuitry configured to generate sensed signals having signal levels depending on self-capacitances of connected ones of the sensing electrodes, the connected ones of the sensing electrodes being connected to the sensing circuitry; and a processor configured to perform touch sensing of the touch panel, based on the sensed signals. When the touch panel device is placed in a first state, the selector circuitry operates to electrically connect first sensing electrodes selected from the plurality of sensing electrodes to the sensing circuitry during each operation cycle which has a given time duration. When the touch panel device is placed in a second state, the selector circuitry operates to electrically connect second sensing electrodes selected from the plurality of sensing electrodes to the sensing circuitry during each operation cycle. The number of the second sensing electrodes connected to the sensing circuitry during each operation cycle when the touch panel device is placed in the second state is less than the number of the first sensing electrodes connected to the sensing circuitry during each operation cycle when the touch panel device is placed in the first state.

Provided in another embodiment is a touch controller for performing touch sensing with respect to a touch panel including a plurality of sensing electrodes. The touch controller includes: a plurality of external connection terminals to be connected to the plurality of sensing electrodes, respectively; a selector circuitry; a sensing circuitry configured to generate sensed signals having signal levels depending on self-capacitances of connected ones of the sensing electrodes, the connected ones of the sensing electrodes being connected to the sensing circuitry; and a processor configured to perform touch sensing of the touch panel, based on the sensed signals. When the touch controller is placed in a first state, the selector circuitry operates to electrically connect first sensing electrodes selected from the plurality of sensing electrodes to the sensing circuitry during each operation cycle which has a given time duration. When the touch panel device is placed in a second state, the selector circuitry operates to electrically connect second sensing electrodes selected from the plurality of sensing electrodes to the sensing circuitry. The number of the second sensing electrodes connected to the sensing circuitry during each operation cycle when the touch panel device is placed in the second state is less than the number of the first sensing electrodes connected to the sensing circuitry during each operation cycle when the touch panel device is placed in the first state.

Provided in still another embodiment is a touch sensing method for performing touch sensing of a touch panel including a plurality of sensing electrodes in a touch panel device. The method includes performing selected one of first and second operations during each operation cycle having a given time duration. The first operation includes: electrically connecting first sensing electrodes selected from the plurality of sensing electrodes to a sensing circuitry by a selector circuitry of the touch panel device; by the sensing circuitry, generating first sensed signals having signal levels depending on self-capacitances of connected ones of the first sensing electrodes, the connected ones of the first sensing electrodes being connected to the sensing circuitry; and performing touch sensing with respect to the first sensing electrodes, based on the first sensed signals. The second operation includes: electrically connecting second sensing electrodes selected from the plurality of sensing electrodes to the sensing circuitry by the selector circuitry; by the sensing circuitry, generating second sensed signals having signal levels depending on self-capacitances of connected ones of the second sensing electrodes, the connected ones of the second sensing electrodes being connected to the sensing circuitry; and performing touch sensing with respect to the second sensing electrodes, based on the second sensed signals. The number of the second sensing electrodes connected to the sensing circuitry in each operation cycle when the second operation is performed is less than the number of the first sensing electrodes connected to the sensing circuitry during each operation cycle when the first operation is performed.

The present disclosure effectively achieves at least one of improvement in the touch sensing sensitivity and reduction in power consumption.

BRIEF DESCRIPTION OF THE DRAWINGS

The above and other advantages and features of the present invention will be more apparent from the following description taken in conjunction with the accompanied drawings, in which:

FIG. 2 is a timing chart illustrating one example of the operation of a display system when operation #1 (touch sensing with respect to the entire area of the touch panel) is performed;

FIG. 3B is a block diagram schematically illustrating the operation of the touch panel device in phase PH2 of operation #1;

FIG. 3C is a block diagram schematically illustrating the operation of the touch panel device in phase PH3 of operation #1;

FIG. 3D is a block diagram schematically illustrating the operation of the touch panel device in phase PH4 of operation #1;

FIG. 8 is a timing chart illustrating one example of the operation of a display system including the touch panel device illustrated in FIG. 7 when operation #2 is performed in touch sensing;

FIG. 9B is a block diagram schematically illustrating the operation of the touch panel device illustrated in FIG. 7 in phase PH2 of operation #2;

FIG. 10 is a block diagram schematically illustrating still another example of the configuration of a touch panel device in the present embodiment;

FIG. 11B is a block diagram schematically illustrating the operation of the touch panel device illustrated in FIG. 10 in phase PH2 of operation #2;

DESCRIPTION OF PREFERRED EMBODIMENTS

Figure 1:
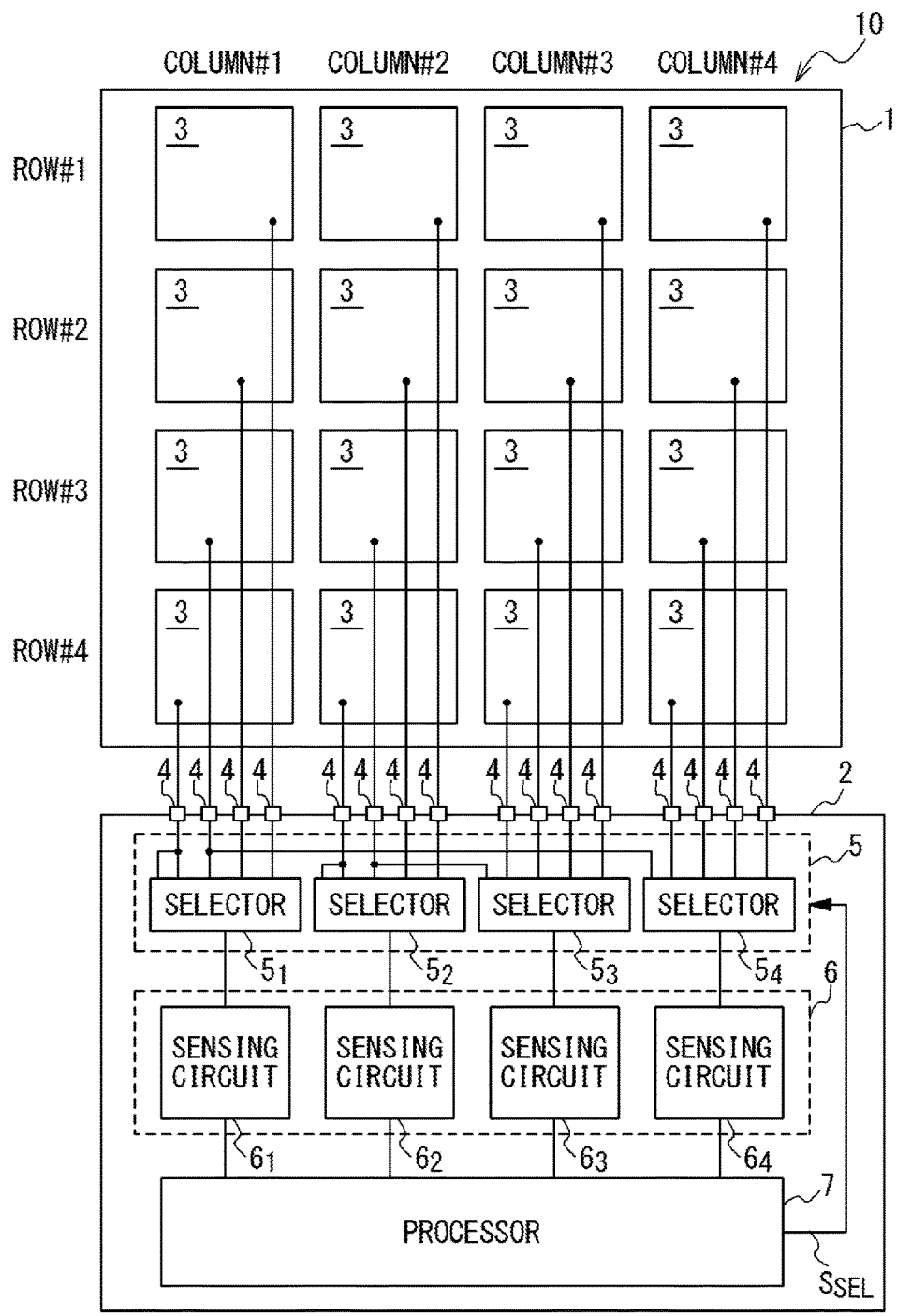
FIG. 1 is a block diagram schematically illustrating one example of the configuration of a touch panel device in one embodiment.

The invention will be now described herein with reference to illustrative embodiments. Those skilled in the art would recognize that many alternative embodiments can be accomplished using the teachings of the present invention and that the invention is not limited to the embodiments illustrated for explanatory purposes.

It will be also appreciated that same or similar reference numerals denote same, similar or corresponding elements. It will be also appreciated that for simplicity and clarity of illustration, elements in the Figures have not necessary drawn to scale. For example, the dimensions of some of the elements are exaggerated relative to other elements.

In one embodiment, a touch panel device includes: a touch panel including a plurality of sensing electrodes; a selector circuitry; a sensing circuitry configured to generate sensed signals having signal levels depending on the self-capacitances of connected ones of the plurality of sensing electrodes, which are connected to the sensing circuitry; and a processor configured to perform touch sensing of the touch panel on the basis of the sensed signals. When the touch panel device is placed in a first state, the selector circuitry operates to electrically connect first sensing electrodes selected from the plurality of sensing electrodes to the sensing circuitry, in each operation cycle having a given time duration. When the touch panel device is placed in a second state, on the other hand, the selector circuitry operates to electrically connect second sensing electrodes selected from the plurality of sensing electrodes to the sensing circuitry, in each operation cycle. The number of the second sensing electrodes connected to the sensing circuitry in each operation cycle in the case when the touch panel device is placed in the second state is less than the number of the first sensing electrodes connected to the sensing circuitry in each operation cycle in the case when the touch panel device is placed in the first state.

In the touch panel device thus configured, touch sensing can be performed for a relatively wide area of the touch panel by placing the touch panel device in the first state, since the number of the first sensing electrodes connected to the sensing circuitry in each operation cycle when the touch panel device is placed in the first state is relatively increased.

On the other hand, the number of times of touch sensing performed on the second sensing electrodes can be increased in each operation cycle when the touch panel device is placed in the second state, since the number of the second sensing electrodes connected to the sensing circuitry in each operation cycle is relatively decreased. This effectively allows touch sensing with a high sensitivity. If the number of times of touch sensing performed on the second sensing electrodes is decreased in each operation cycle (for example, the number of times of touch sensing performed on the second sensing electrodes is one in each operation cycle), the power consumption can be effectively reduced, since the total number of sensing electrodes for which touch sensing is performed can be decreased in each operation cycle.

In the following, a specific description is given of various embodiments of the present disclosure.

FIG. 1 is a block diagram schematically illustrating the configuration of a touch panel device 10 in one embodiment. The touch panel device 10 includes a touch panel 1 and a touch controller 2. The touch panel 1 includes a plurality of sensing electrodes 3. In the present embodiment, the sensing electrodes 3 are arrayed in rows and columns. The sensing electrodes 3 are arrayed in four rows and four columns in the example illustrated in FIG. 1; however, the number of the sensing electrodes 3 may be variously modified. It should be especially noted that, in an actual implementation, the numbers of rows and columns of the sensing electrodes 3 may be further increased, for example, in the order of several tens.

It should be also noted that the touch panel device 10 may be implemented in various forms. In an actual implementation, the touch panel 1 may be integrated within a liquid crystal display panel. When pixels (each including a pixel electrode and a thin film transistor) and counter electrodes (also referred to as common electrodes) are monolithically integrated within an active matrix substrate of the liquid crystal display panel, the counter electrodes may be also used as the sensing electrodes 3. In this case, the active matrix substrate also functions as the touch panel 1. When a plurality of counter electrodes arrayed in rows and columns are formed in the counter substrate of a liquid crystal display panel, the counter substrate may be also used as the touch panel 1. In this case, the counter electrodes formed in the counter substrate may be used as the sensing electrodes 3. The touch controller 2 may be implemented as a discrete integrated circuit (IC) or monolithically integrated within a display panel driver which drives a display panel (e.g. a liquid crystal display panel and an OLED (organic light emitting diode) display panel). Examples of specific implementations of the touch panel device 10 will be described later.

The touch controller 2 is configured to perform self-capacitance touch sensing with respect to the touch panel 1. The touch controller 2 includes a plurality of external connection terminals 4, a selector circuitry 5, a sensing circuitry 6 and a processor 7.

The external connection terminals 4 are respectively connected to the sensing electrodes 3. One external connection terminal 4 is provided for each sensing electrode 3 and each external connection terminal 4 is connected to the associated sensing electrode 3 via an interconnection formed in the touch panel 1.

The selector circuitry 5 is configured to switch the connections between the sensing electrodes 3 and the sensing circuitry 6 (that is, the connections between the external connection terminals 4 and the sensing circuitry 6) in response to a control signal $S_{SEL}$ received from the processor 7. In the present embodiment, the selector circuitry 5 includes four selectors $5_1$ to $5_4$; it should be noted that the number of the selectors 5 is equal to the number of the rows of the sensing electrodes 3 in the present embodiment. Each selector $5_i$ is associated with a column of sensing electrodes 3 and connected to the sensing electrodes 3 in the associated column #i (that is, the external connection terminals 4 connected to the sensing electrodes 3 in the associated column.) Each selector $5_i$ is configured to select any one of the sensing electrodes 3 connected thereto and electrically connects the selected sensing electrode to the sensing circuitry 6. For example, the selector $5_1$ is configured to connect a selected one of the four sensing electrodes 3 positioned in column #1 to the sensing circuitry 6 and the selector $5_2$ is configured to connect a selected one of the four sensing electrodes 3 positioned in column #2 to the sensing circuitry 6.

In the present embodiment, some of the selectors $5_1$ to $5_4$ are also connected to a sensing electrode 3 positioned in a column different than the associated column (that is, an external connection terminal 4 connected to a sensing electrode 3 positioned in a column different than the associated column.) These selectors are each configured to select any one of the sensing electrodes 3 positioned in the associated column and a sensing electrode positioned in a column different than the associated column, and electrically connect the selected sensing electrode 3 to the sensing circuitry 6. In the example illustrated in FIG. 1, the selector $5_3$ is connected to the sensing electrode 3 positioned in row #3, column #2, in addition to the sensing electrodes 3 positioned in column #3, and configured to connect a selected one of the sensing electrodes 3 positioned in column #3 and the sensing electrode 3 positioned in row #3, column #2 to the sensing circuitry 6. Furthermore, the selector $5_4$ is connected to the sensing electrode 3 positioned in row #3, column #1, in addition to the sensing electrodes 3 positioned in column #4, and configured to connect a selected one of the sensing electrodes 3 positioned in column #4 and the sensing electrode 3 positioned in row #3, column #1 to the sensing circuitry 6.

The sensing circuitry 6 includes a plurality of sensing circuits $6_1$ to $6_4$. In the present embodiment, the number of the sensing circuits $6_1$ to $6_4$ is equal to the number of the columns of the sensing electrodes 3, that is, the number of the selectors $5_1$ to $5_4$. The sensing circuits $6_1$ to $6_4$ are connected to the selectors $5_1$ to $5_4$, respectively. The sensing electrode 3 connected to each sensing circuit $6_i$ is selected by the associated selector $5_i$. In other words, each selector $5_i$ electrically connects a selected one of the sensing electrodes 3 connected thereto to the associated sensing circuit $6_i$. Each sensing circuit $6_i$ generates a sensed signal corresponding to the self-capacitance of the sensing electrode 3 selected by the selector $5_i$ (that is, a sensed signal having a signal level depending on the self-capacitance of the sensing electrode 3 selected by the selector $5_i$.)

The processor 7 performs touch sensing, that is, sensing of a position at which a conductor (such as a human finger) is in contact with the touch panel 1, on the basis of the sensed signals generated by the sensing circuits $6_1$ to $6_4$ of the sensing circuitry 6. Additionally, the processor 7 generates the control signal $S_{SEL}$ to control the connections between the sensing electrodes 3 and the sensing circuitry 6. The control signal $S_{SEL}$ may be generated in accordance with the settings of the touch panel device 10 and/or in response to the result of touch sensing.

Next, a description is given of the operation of the touch panel device 10 in the present embodiment. The touch panel device 10 in the present embodiment is used in a display system including a display panel and the touch panel 1 (where the touch panel 1 may be integrated within the display panel.) In this display system, image displaying and touch sensing are performed in each operation cycle which has a predefined time duration (e.g. 16 ms).

In the present embodiment, selected one of two operations, hereinafter referred to as operations #1 and #2, is performed in touch sensing of each operation cycle. In operation #1, touch sensing is performed with respect to the entire area of the touch panel 1, that is, with respect to all the sensing electrodes 3 of the touch panel 1, in each operation cycle. In operation #2, on the other hand, touch sensing is performed only with respect to a partial area of the touch panel 1, that is, only with respect to some but not all of the sensing electrodes 3. It should be noted that the number of sensing electrodes 3 with respect to which touch sensing is performed in operation #2 is less than the number of sensing electrodes 3 with respect to which touch sensing is performed in operation #1, since operation #1 involves touch sensing with respect to all the sensing electrodes 3 of the touch panel 1 while operation #2 involves touch sensing only with respect to some but not all of the sensing electrodes 3 in operation #2.

FIG. 2 is a timing chart illustrating an exemplary operation of the display system when operation #1 is performed in touch sensing and FIGS. 3A to 3D are block diagrams schematically illustrating the operation of the touch panel device 10 in the respective phases of operation #1.

In the present embodiment, as illustrated in FIG. 2, image displaying and touch sensing are alternately performed in each operation cycle. In other words, each operation cycle includes a plurality of display periods and a plurality of touch sensing periods, where the display periods are periods in which image displaying is performed and the touch sensing periods are periods in which touch sensing is performed. It should be noted that touch sensing is denoted by the legends "operation #1" in FIG. 2, because operation #1 is performed in touch sensing.

Operation #1 includes a plurality of phases, the number of which is equal to the number of the rows of the sensing electrodes 3, and touch sensing is performed with respect to a selected row of sensing electrodes 3 in each phase. In each phase, three times of sensing operations are performed with respect to the selected row of sensing electrodes 3 in synchronization with a clock signal CLK. In each sensing operation, sensed signals corresponding to the self-capacitances of the selected sensing electrodes 3 are obtained once by the sensing circuits $6_1$ to $6_4$.

When the touch panel device 10 (or the touch controller 2) is placed into a state in which operation #1 is performed (which may be referred to as "first state"), image displaying, the number of times of which is equal to the number of rows of the sensing electrodes 3 is performed in each operation cycle and one phase of operation #1 is performed every after the image displaying. In the present embodiment, the number of the rows of the sensing electrodes 3 is four and operation #1 includes four phases PH1 to PH4. Touch sensing is performed with respect to the sensing electrodes 3 positioned in row #1 in phase PH1, and to the sensing electrodes 3 positioned in row #2 in phase PH2. Similarly, touch sensing is performed with respect to the sensing electrodes 3 positioned in row #3 in phase PH3 and to the sensing electrodes 3 positioned in row #4 in phase PH4. As thus described, in operation #1, the rows of the sensing electrodes 3 are sequentially selected and touch sensing is performed with respect to the sensing electrodes 3 positioned in the selected row. Accordingly, touch sensing is performed with respect to all the sensing electrodes 3 included in the touch panel 1.

Figure 3A:
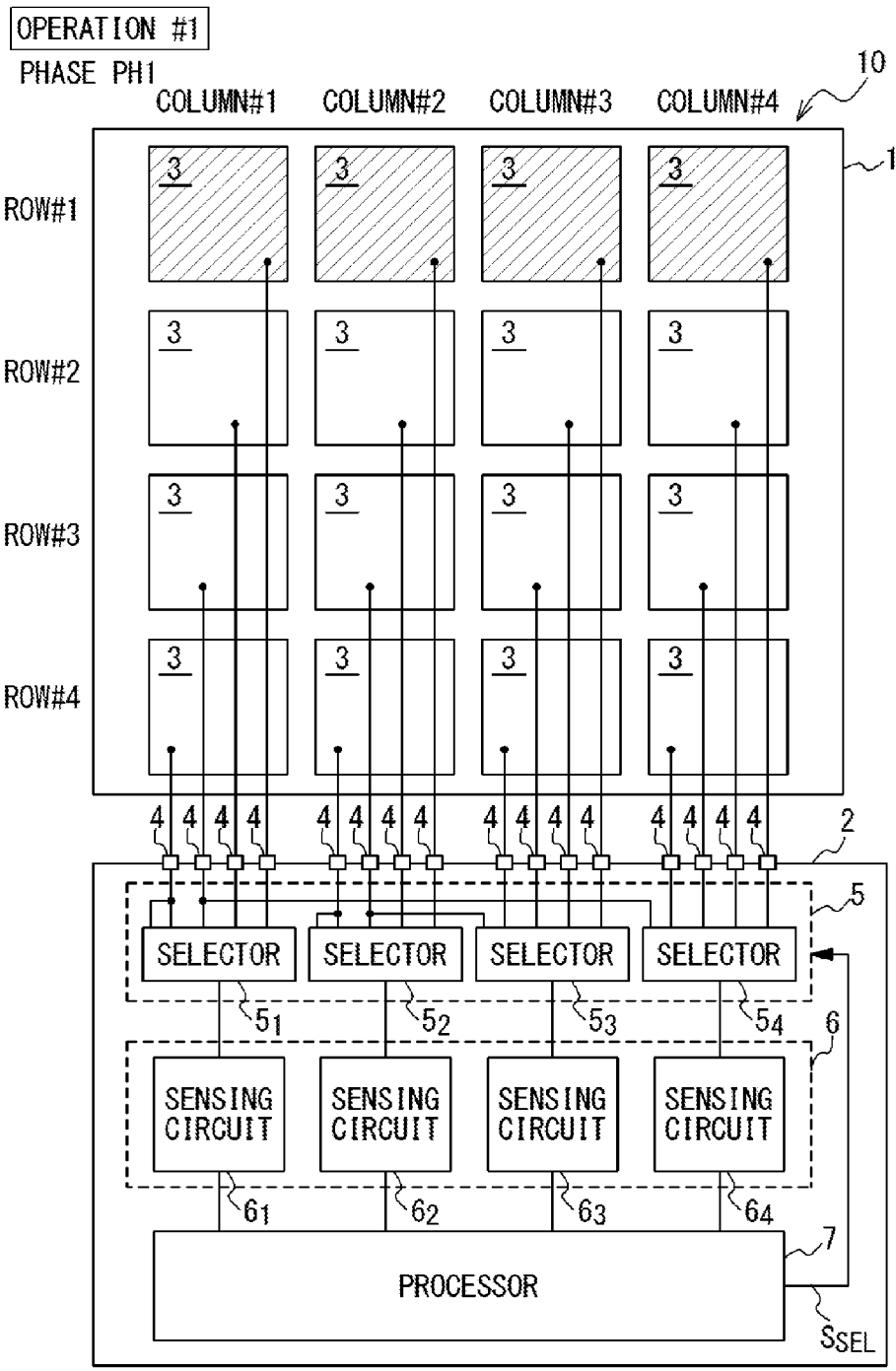
FIG. 3A is a block diagram schematically illustrating the operation of the touch panel device in phase PH1 of operation #1.

In detail, in the operation illustrated in FIG. 2, the first image displaying is performed in the first display period just after the start of each operation cycle and then phase PH1 of operation #1 is performed in the first touch sensing period. FIG. 3A illustrates an exemplary operation of the touch panel device 10 in phase PH1. In phase PH1, the sensing electrodes 3 positioned in row #1 are selected by the selectors $5_1$ to $5_4$ under the control of the control signal $S_{SEL}$, and connected to the sensing circuits $6_1$ to $6_4$, respectively. It should be noted that the sensing electrodes 3 selected by the selectors $5_1$ to $5_4$ are indicated by hatching in FIG. 3A (the similar goes for FIG. 3B to FIG. 3D.) The sensing circuits $6_1$ to $6_4$ respectively generate the sensed signals corresponding to the self-capacitances of the sensing electrodes 3 connected thereto. The sensed signals may be generated by using any method known in the art in relation to self-capacitance touch sensing.

This is followed by performing the second image displaying in the second display period, and phase PH2 of operation #1 is then performed in the second touch sensing period. FIG. 3B illustrates an exemplary operation of the touch panel device 10 in phase PH2. In phase PH2, the sensing electrodes 3 positioned in row #2 are selected by the selectors $5_1$ to $5_4$ and connected to the sensing circuits $6_1$ to $6_4$, respectively. The sensing circuits $6_1$ to $6_4$ respectively generate the sensed signals corresponding to the self-capacitances of the sensing electrodes 3 connected thereto.

This is further followed by performing the third image displaying in the third display period, and phase PH3 of operation #1 is then performed in the third touch sensing period. FIG. 3C illustrates an exemplary operation of the touch panel device 10 in phase PH3. In phase PH3, the sensing electrodes 3 positioned in row #3 are selected by the selectors $5_1$ to $5_4$ and connected to the sensing circuits $6_1$ to $6_4$, respectively. The sensing circuits $6_1$ to $6_4$ respectively generate the sensed signals corresponding to the self-capacitances of the sensing electrodes 3 connected thereto.

This is further followed by performing the fourth image displaying in the fourth display period, and phase PH4 of operation #1 is then performed in the fourth touch sensing period. FIG. 3D illustrates an exemplary operation of the touch panel device 10 in phase PH4. In phase PH4, the sensing electrodes 3 positioned in row #4 are selected by the selectors $5_1$ to $5_4$ and connected to the sensing circuits $6_1$ to $6_4$, respectively. The sensing circuits $6_1$ to $6_4$ respectively generate the sensed signals corresponding to the self-capacitances of the sensing electrodes 3 connected thereto.

The processor 7 performs an operation for touch sensing, that is, an operation for sensing the position at which a conductor (such as a human body and a stylus) is placed into contact with the touch panel 1, on the basis of the sensed signals obtained for the respective sensing electrodes 3. Through the above-described procedure, touch sensing with respect to all the sensing electrodes 3 of the touch panel 1, that is, with respect to the entire area of the touch panel 1 is achieved in operation #1.

Figure 4:
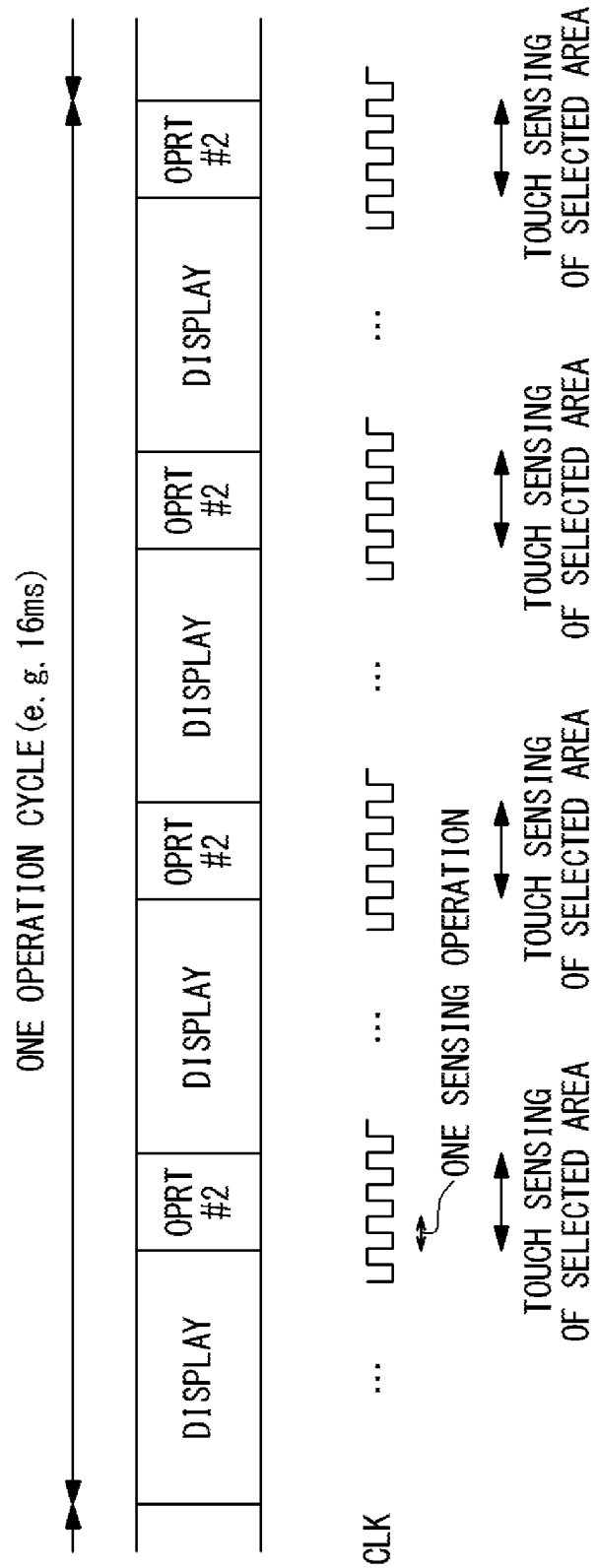
FIG. 4 is a timing chart illustrating one example of the operation of a display system when operation #2 (touch sensing with respect to a selected area of the touch panel) is performed.
Figure 5:
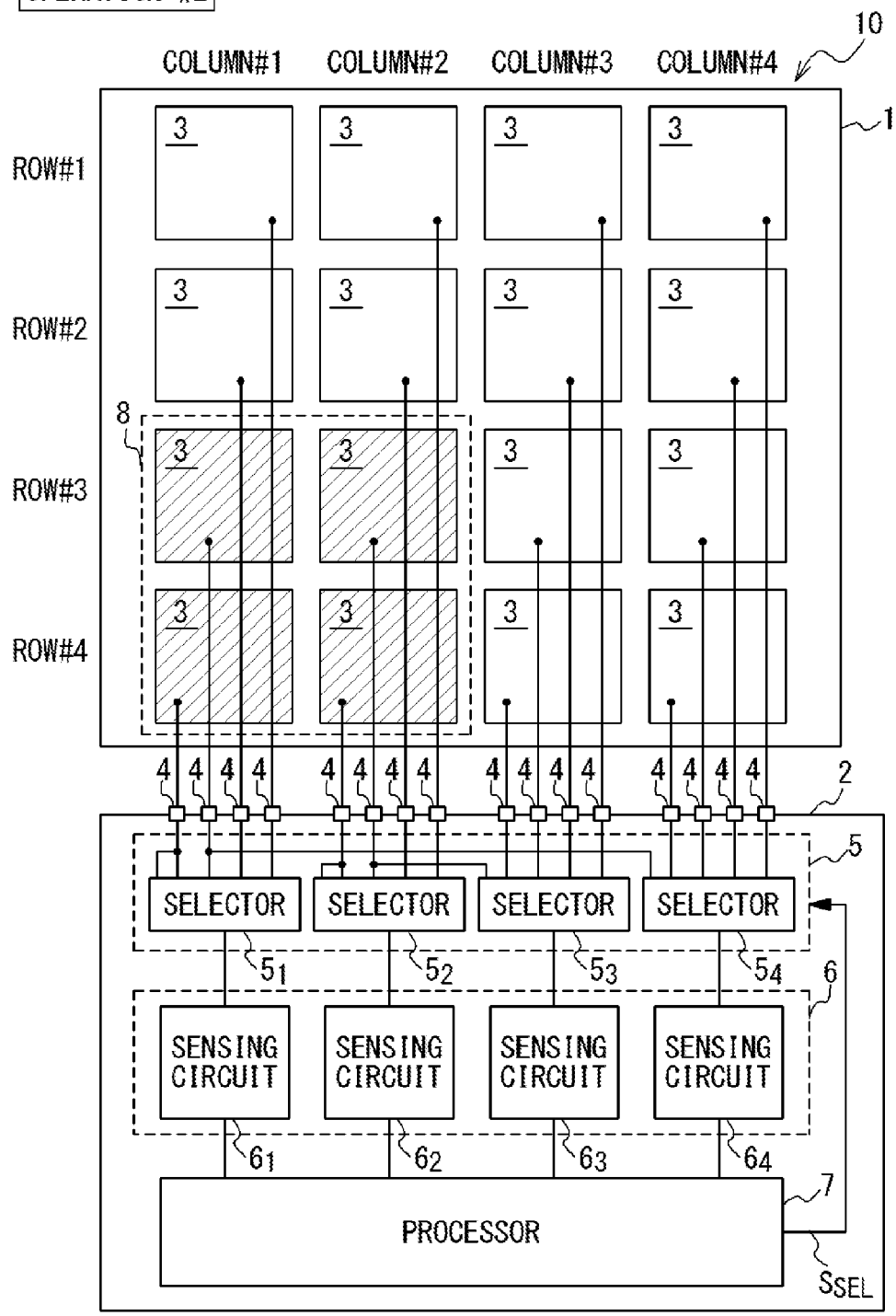
FIG. 5 is a block diagram schematically illustrating the operation of the touch panel device in operation #2.

FIG. 4 is a timing chart illustrating an exemplary operation of the display system when operation #2 is performed in touch sensing and FIG. 5 is a block diagram schematically illustrating the operation of the touch panel device 10 in operation #2.

In operation #2, as illustrated in FIG. 5, touch sensing is performed with respect to sensing electrodes 3 positioned a partial area of the touch panel 1 (which is hereinafter referred to as the "selected area 8") in each operation cycle. In the example illustrated in FIG. 5, touch sensing is performed with respect to the sensing electrodes 3 positioned in rows #3 and #4 and columns #1 and #2. It should be noted that, in the present embodiment, as is understood from FIGS. 1 and 5, the sensing electrodes 3 positioned in the selected area 8 can be electrically connected to the sensing circuits $6_1$ to $6_4$ through the selector $5_1$ to $5_4$, respectively.

When the touch panel device 10 (or the touch controller 2) is placed into a state in which operation #2 is performed (which may be referred to as the "second state" hereinafter), as illustrated in FIG. 4, image displaying, the number of times of which is equal to the number of rows of the sensing electrodes 3 is performed in each operation cycle and operation #2 is performed every after the image displaying. In other words, image displaying is performed in each of the four display periods of each operation cycle, and touch sensing is performed with respect to the selected area 8 in each of the four touch sensing periods of each operation cycle. It should be noted that, in operation #2, multiple times of touch sensing with respect to the selected area 8 are performed in each operation cycle. This implies that the sensitivity of touch sensing can be enhanced with respect to the selected area 8.

In operation #2, the sensing electrodes 3 included in the selected area 8 are electrically connected to the sensing circuit $6_1$ to $6_4$. More specifically, the sensing electrode 3 positioned in row #4, column #1 is selected by the selector $5_1$ and electrically connected to the sensing circuit $6_1$, and the sensing electrode 3 positioned in row #4, column #2 is selected by the selector $5_2$ and electrically connected to the sensing circuit $6_2$. Furthermore, the sensing electrode 3 positioned in row #3, column #2 is selected by the selector $5_3$ and electrically connected to the sensing circuit $6_3$ and the sensing electrode 3 positioned in row #3, column #1 is selected by the selector $5_4$ and electrically connected to the sensing circuit $6_4$. It should be noted that the selector $5_3$ electrically connects a sensing electrode 3 positioned in a column different than the column associated therewith to the sensing circuit $6_3$ and selector $5_4$ electrically connects a sensing electrode 3 positioned in a column different than the column associated therewith to the sensing circuit $6_4$.

It should be also noted that sensing electrodes 3 positioned in the same single row are simultaneously connected to the sensing circuits $6_1$ to $6_4$ in operation #1, while sensing electrodes 3 positioned in multiple rows are simultaneously connected to the sensing circuits $6_1$ to $6_4$ in operation #2. This operation allows setting the selected area 8 so that the elected area 8 is prolonged in the column direction.

The sensing circuits $6_1$ to $6_4$ respectively generate the sensed signals corresponding to the self-capacitances of the sensing electrodes 3 connected thereto. The processor 7 performs an operation for touch sensing, that is, an operation for sensing the position at which a conductor (such as a human body and a stylus) is placed into contact with the selected area 8, on the basis of the sensed signals obtained for the respective sensing electrodes 3 positioned in the selected area 8. Through the above-described procedure, touch sensing with respect to the selected area 8 of the touch panel 1, that is, with respect to the sensing electrodes 3 positioned in the selected area 8 is achieved in operation #2.

Operation #2 effectively achieves touch sensing with the selected area 8 with a high sensitivity, since multiple times of touch sensing are performed with respect to the selected area 8 (that is, touch sensing is performed with respect to the selected area 8 in each of the multiple touch sensing periods) in each operation cycle. This operation #2 is useful for the case when touch sensing with a high sensitivity is required with respect to a specific area of the touch panel 1, for example, the case when a user input is performed with a stylus.

Figure 6:
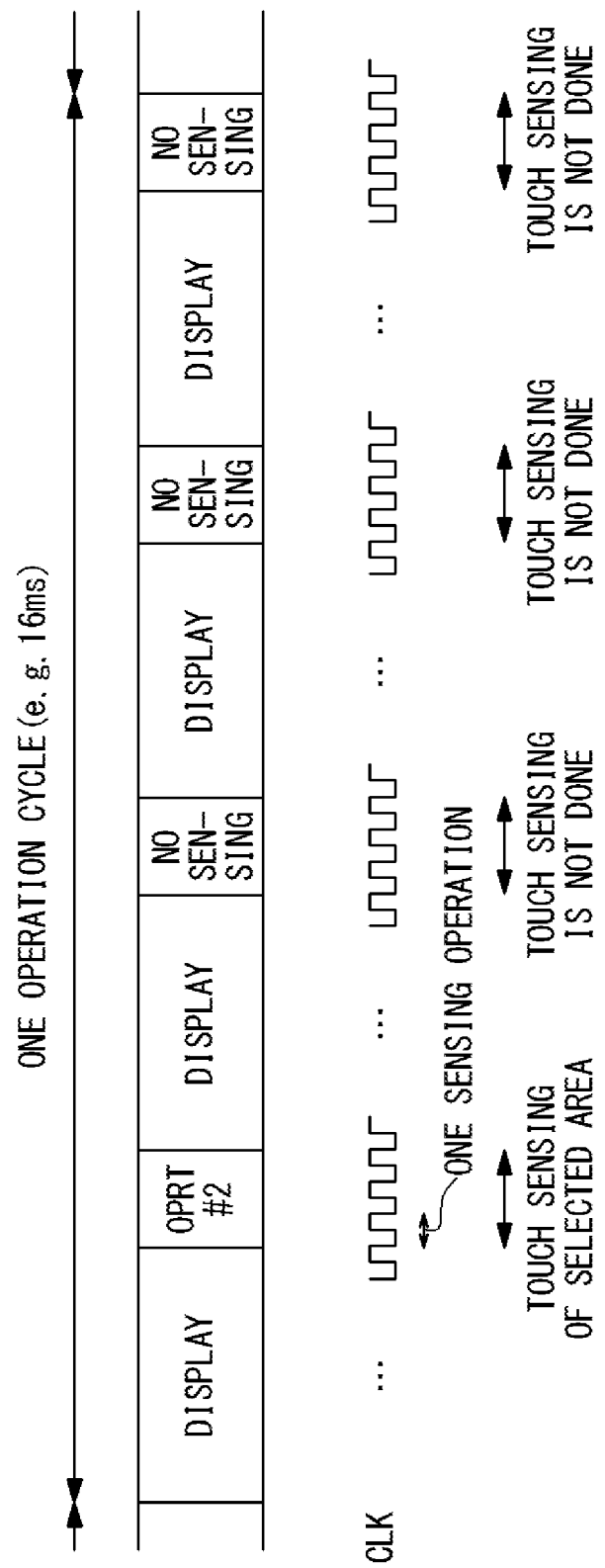
FIG. 6 is a timing chart illustrating another example of the operation of a display system when operation #2 is performed in touch sensing.

In an alternative embodiment, as illustrated in FIG. 6, touch sensing with respect to the sensing electrodes 3 of the selected area 8 may be performed only once in each operation cycle in operation #2. In other words, touch sensing with respect to the selected area 8 may be performed only one of the touch sensing periods in each operation cycle. In the operation illustrated in FIG. 6, touch sensing is performed with respect to the selected area 8 after the first image displaying, and no touch sensing is performed after the second to fourth image displayings. Although touch sensing with a high sensitivity is not achieved, such operation effectively reduces the power consumption of the touch panel device 10, because the total number of sensing electrodes 3 for which touch sensing is performed is effectively reduced in each operation cycle.

In another alternative embodiment, the number of sensing electrodes 3 positioned in the selected area 8 may be more than the number of the sensing circuit $6_1$ to $6_4$, although the above-described embodiments recite that the number of the sensing electrodes 3 positioned in the selected area 8 is equal to the number of the sensing circuits $6_1$ to $6_4$ and the sensing electrodes 3 positioned in the selected area 8 are simultaneously connected to the sensing circuits $6_1$ to $6_4$. In this case, the sensing electrodes 3 positioned in the selected area 8 are time-divisionally connected to the sensing circuit $6_1$ to $6_4$ in operation #2. The association of the sensing electrodes 3 positioned in the selected area 8 with the sensing circuits $6_1$ to $6_4$ may be variously modified by modifying interconnections integrated in the touch controller 2 (for example, interconnections connected between the external connection terminals 4 and the selectors $5_1$ to $5_4$.)

Figure 7:
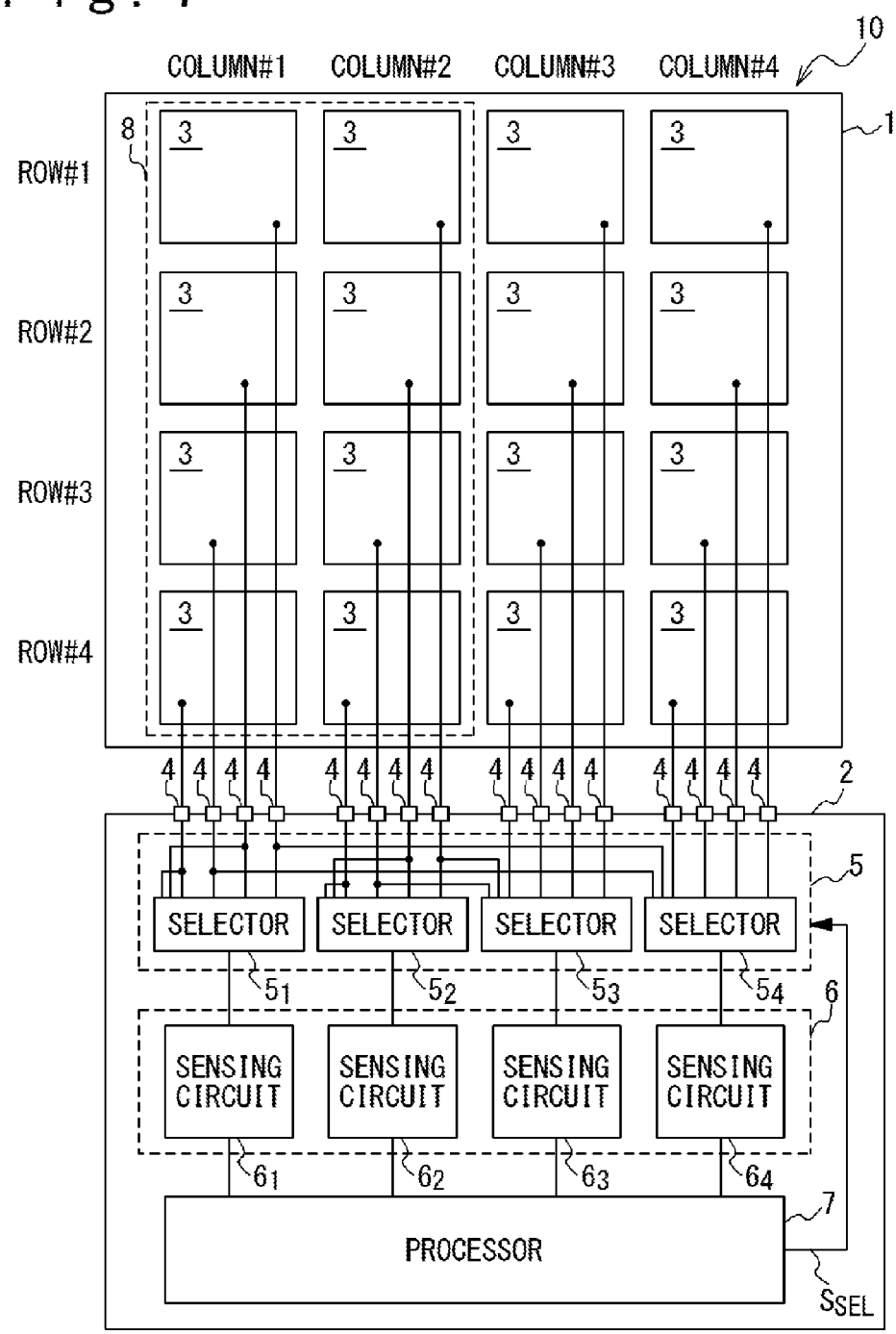
FIG. 7 is a block diagram schematically illustrating another example of the configuration of a touch panel device in the present embodiment.

FIG. 7 is a block diagram illustrating an example of the configuration of the touch panel device 10 configured so that the sensing electrodes 3 positioned in the selected area 8 are time-divisionally connected to the sensing circuits $6_1$ to $6_4$ in operation #2. The configuration of the touch panel device 10 illustrated in FIG. 7 is almost similar to that illustrated in FIG. 1. The difference is that the selected area 8 is defined to accommodate the sensing electrodes 3 positioned in columns #1 and #2 in the touch panel device 10 illustrated in FIG. 7 and the connections between the sensing electrodes 3 and the selectors $5_1$ to $5_4$ are modified from those in the touch panel device 10 illustrated in FIG. 1. More specifically, in the example illustrated in FIG. 7, the selector $5_3$ is connected to the sensing electrodes 3 positioned in row #1, column #2 and in row #3, column #2 in addition to the sensing electrodes 3 positioned in column #3 and configured to electrically connect a selected one of these sensing electrodes 3 connected thereto, to the sensing circuitry 6. Furthermore, the selector $5_4$ is connected to the sensing electrodes 3 positioned in row #1, column #1 and in row #3, column #1 in addition to the sensing electrodes 3 positioned in column #4 and configured to electrically connect a selected one of these sensing electrodes 3 connected thereto, to the sensing circuitry 6.

Figure 9A:
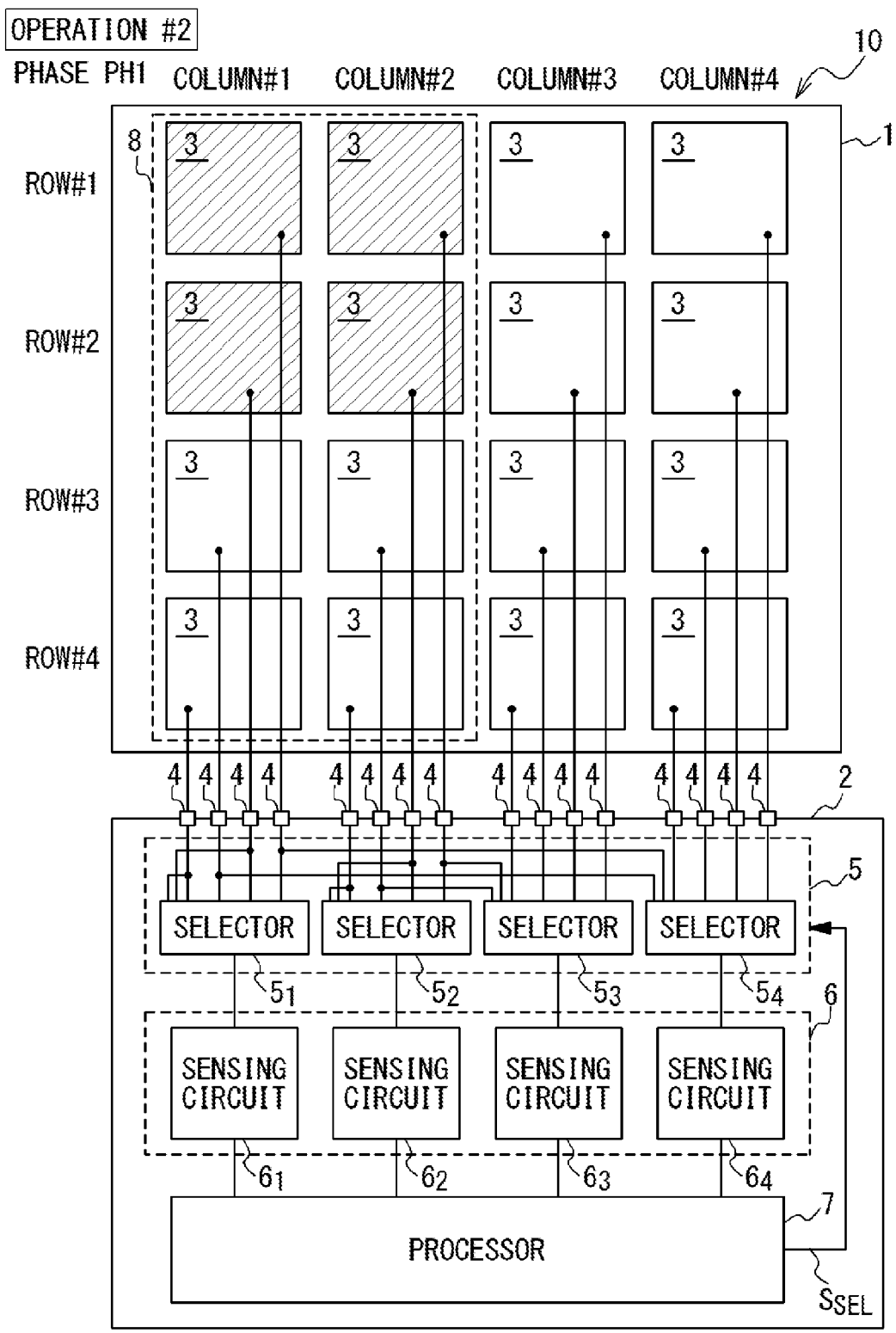
FIG. 9A is a block diagram schematically illustrating the operation of the touch panel device illustrated in FIG. 7 in phase PH1 of operation #2.

FIG. 8 is a timing chart illustrating an exemplary operation of a display system including the touch panel device 10 illustrated in FIG. 7, in the case when touch sensing is performed only with respect to the selected area 8 (operation #2) and FIGS. 9A and 9B are block diagrams schematically illustrating the operation of the touch panel device 10 in phases PH1 and PH2 of operation #2. It should be noted that the operation of the display system including the touch panel device 10 illustrated in FIG. 7 in the case when touch sensing is performed with respect to the entire area of the touch panel 1 (operation #1) is same as that of the display system including the touch panel device 10 illustrated in FIG. 1.

In the operation illustrated in FIG. 8, operation #2 includes two phases PH1 and PH2. When the touch panel device 10 is placed into the state in which operation #2 is performed (the second state), image displaying, the number of times of which is equal to the number of the rows of the sensing electrodes 3 is performed in each operation cycle, and one phase of operation #2 is performed every after the image displaying.

More specifically, in the operation illustrated FIG. 8, the first image displaying is performed in the first display period after each operation cycle is started, and phase PH1 of the operation #2 is then performed in the first touch sensing period. FIG. 9A illustrates an exemplary operation of the touch panel device 10 in phase PH1. In phase PH1, under the control of the control signal $S_{SEL}$, the sensing electrode 3 positioned in row #2, column #1 is selected by the selector $5_1$ and electrically connected to the sensing circuit $6_1$ and the sensing electrode 3 positioned in row #2, column #2 is selected by the selector $5_2$ and electrically connected to the sensing circuit $6_2$. Furthermore, the sensing electrode 3 positioned in row #1, column #2 is selected by the selector $5_3$ and electrically connected to the sensing circuit $6_3$ and the sensing electrode 3 positioned in row #1, column #1 is selected by the selector $5_4$ and electrically connected to the sensing circuit $6_4$. It should be noted that the sensing electrodes 3 selected by the selectors $5_1$ to $5_4$ are indicated by hatching in FIG. 9A (the similar goes for FIG. 9B.) The sensing circuits $6_1$ to $6_4$ respectively generate the sensed signals corresponding to the self-capacitances of the sensing electrodes 3 connected thereto. The sensed signals may be generated by using any method known in the art in relation to self-capacitance touch sensing.

This is followed by performing the second image displaying in the second display period, and phase PH2 of operation #2 is then performed in the second touch sensing period. FIG. 9B illustrates an exemplary operation of the touch panel device 10 in phase PH2. In phase PH2, under the control of the control signal $S_{SEL}$, the sensing electrode 3 positioned in row #4, column #1 is selected by the selectors $5_1$ and connected to the sensing circuit $6_1$ and the sensing electrode 3 positioned in row #4, column #2 is selected by the selectors $5_2$ and connected to the sensing circuit $6_2$. Furthermore, the sensing electrode 3 positioned in row #3, column #2 is selected by the selectors $5_3$ and connected to the sensing circuit $6_3$ and the sensing electrode 3 positioned in row #3, column #1 is selected by the selectors $5_4$ and connected to the sensing circuit $6_4$. The sensing circuits $6_1$ to $6_4$ respectively generate the sensed signals corresponding to the self-capacitances of the sensing electrodes 3 connected thereto.

This is further followed by performing the third image displaying in the third display period, and phase PH1 of operation #2 is then performed again in the third touch sensing period. This is further followed by performing the fourth image displaying in the fourth display period, and then performing phase PH2 of operation #2 is then performed again in the fourth touch sensing period. In the operation illustrated in FIG. 8, each of phases PH1 and PH2 of operation #2 is performed twice in each operation cycle.

The processor 7 performs an operation for touch sensing, that is, an operation for sensing the position at which a conductor (such as a human body and a stylus) is placed into contact with the selected area 8, on the basis of the sensed signals obtained for the respective sensing electrodes 3 positioned in the selected area 8. Through the above-described procedure, touch sensing with respect to the selected area 8 of the touch panel 1, that is, with respect to the sensing electrodes 3 positioned in the selected area 8 is achieved in operation #2.

The above-described operation #2 also achieves touch sensing with the selected area 8 with a high sensitivity, since multiple times of touch sensing are performed with respect to the selected area 8 (twice in the operation illustrated in FIG. 8) in each operation cycle.

It should be noted that it is not necessary to use all the sensing circuits $6_1$ to $6_4$ in operation #2, in which touch sensing is performed with respect to the selected area 8, although the above-described embodiments recite that all the sensing circuits $6_1$ to $6_4$ are used in operation #2; some but not all of the sensing circuits $6_1$ to $6_4$ may be used in touch sensing with respect to the selected area 8.

FIG. 10 is a block diagram illustrating an exemplary configuration of a touch panel device 10 in which some but not all of the sensing circuits $6_1$ to $6_4$ are used in touch sensing with respect to the selected area 8 (operation #2). The configuration of the touch panel device 10 illustrated in FIG. 10 is almost similar to those illustrated in FIGS. 1 and 7. The difference is that the selected area 8 is defined to accommodate six sensing electrodes 3 positioned in columns

1 and #2 in the touch panel device 10 illustrated in FIG. 10 and the connections between the sensing electrodes 3 and the selectors $5_1$ to $5_4$ are modified from those in the touch panel devices 10 illustrated in FIGS. 1 and 7.

More specifically, in the example illustrated in FIG. 10, the selector $5_3$ is connected to the sensing electrodes 3 positioned in row #3, column #1 and in row #3, column #2, in addition to the sensing electrodes 3 positioned in columns #3 and configured to electrically connect a selected one of these sensing electrodes 3 connected thereto, to the sensing circuitry 6. The selectors $5_1$, $5_2$ and $5_4$ are connected to the sensing electrodes 3 positioned in the associated columns #1, #2 and #4, respectively, and configured to electrically connect selected ones of these sensing electrodes 3 connected thereto, to the sensing circuitry 6.

Figure 11A:
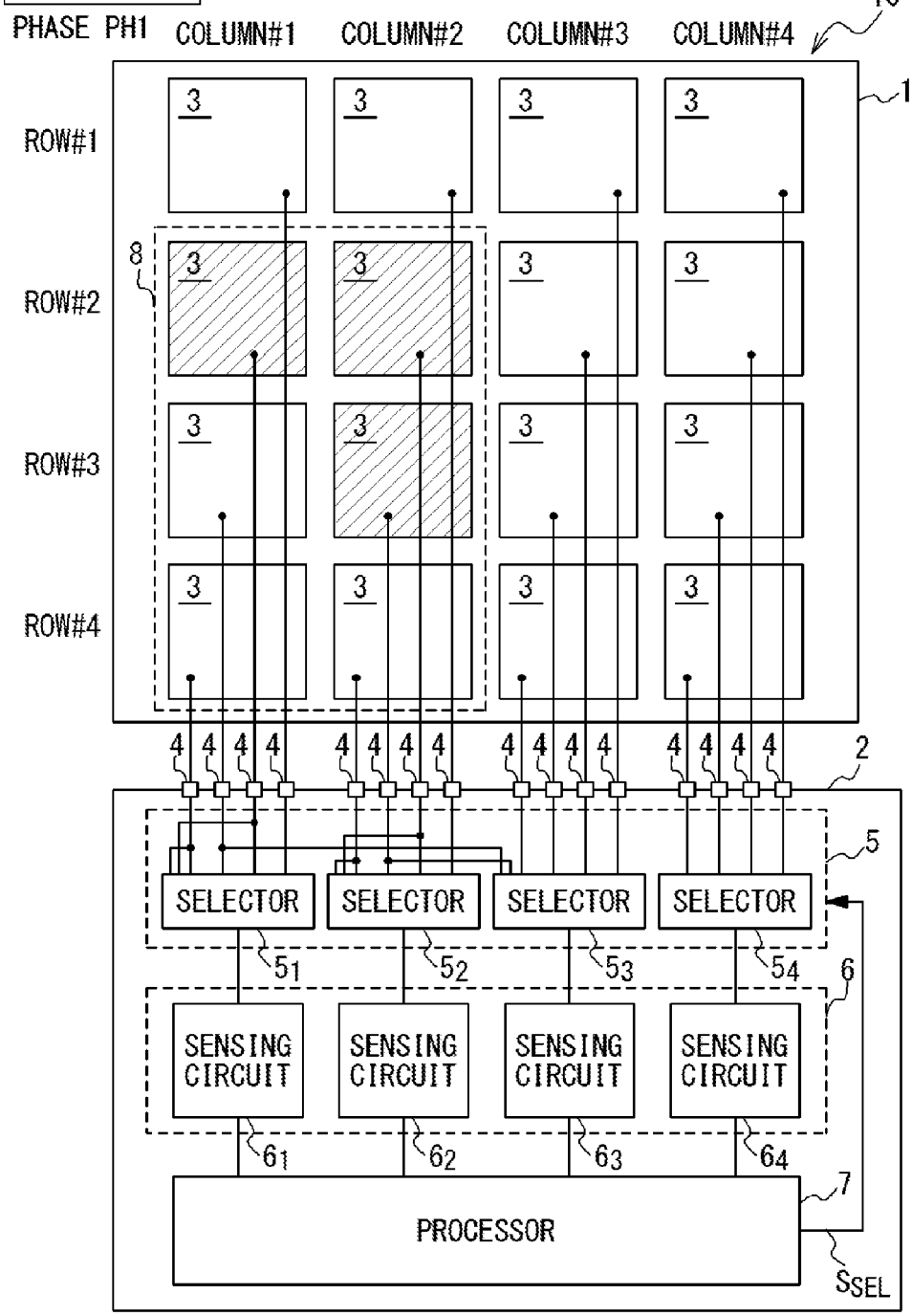
FIG. 11A is a block diagram schematically illustrating the operation of the touch panel device illustrated in FIG. 10 in phase PH1 of operation #2.

FIGS. 11A and 11B are block diagrams schematically illustrating the operation of the touch panel device 10 in phases PH1 and PH2 of operation #2, in which touch sensing is performed only with respect to the selected area 8. It should be noted that the operation of the display system including the touch panel device 10 illustrated in FIG. 10 in the case when touch sensing is performed with respect to the entire area of the touch panel 1 (operation #1) is same as that of the display system including the touch panel device 10 illustrated in FIG. 1.

The operation of the touch panel device 10 illustrated in FIG. 10 in operation #2, in which touch sensing is performed only with respect to the selected area 8 is almost similar to that illustrated in FIG. 8, except for the selections of the sensing electrodes 3 in phases PH1 and PH2.

The first image displaying is performed in the first display period after each operation cycle is started, and phase PH1 of the operation #2 is then performed in the first touch sensing period. FIG. 11A illustrates an exemplary operation of the touch panel device 10 in phase PH1. In phase PH1, under the control of the control signal $S_{SEL}$, the sensing electrode 3 positioned in row #2, column #1 is selected by the selector $5_1$ and electrically connected to the sensing circuit $6_1$ and the sensing electrode 3 positioned in row #2, column #2 is selected by the selector $5_2$ and electrically connected to the sensing circuit $6_2$. Furthermore, the sensing electrode 3 positioned in row #3, column #2 is selected by the selector $5_3$ and electrically connected to the sensing circuit $6_3$. It should be noted that the sensing electrodes 3 selected by the selectors $5_1$ to $5_3$ are indicated by hatching in FIG. 11A (the similar goes for FIG. 11B.) The sensing circuits $6_1$ to $6_3$ respectively generate the sensed signals corresponding to the self-capacitances of the sensing electrodes 3 connected thereto. The sensed signals may be generated by using any method known in the art in relation to self-capacitance touch sensing.

This is followed by performing the second image displaying in the second display period, and phase PH2 of operation #2 is then performed in the second touch sensing period. FIG. 11B illustrates an exemplary operation of the touch panel device 10 in phase PH2. In phase PH2, under the control of the control signal $S_{SEL}$, the sensing electrode 3 positioned in row #4, column #1 is selected by the selectors $5_1$ and connected to the sensing circuit $6_1$ and the sensing electrode 3 positioned in row #4, column #2 is selected by the selectors $5_2$ and connected to the sensing circuit $6_2$. Furthermore, the sensing electrode 3 positioned in row #3, column #1 is selected by the selectors $5_3$ and connected to the sensing circuit $6_3$. The sensing circuits $6_1$ to $6_3$ respectively generate the sensed signals corresponding to the self-capacitances of the sensing electrodes 3 connected thereto.

This is further followed by performing the third image displaying in the third display period, and phase PH1 of operation #2 is then performed again in the third touch sensing period. This is further followed by performing the fourth image displaying in the fourth display period, and phase PH2 of operation #2 is then performed again in the fourth touch sensing period. In the operation thus described, each of phases PH1 and PH2 of operation #2 is performed twice in each operation cycle.

The processor 7 performs an operation for touch sensing, that is, an operation for sensing the position at which a conductor (such as a human body and a stylus) is placed into contact with the touch panel 1, on the basis of the sensed signals obtained for the respective sensing electrodes 3. Through the above-described procedure, touch sensing with respect to the selected area 8 of the touch panel 1, that is, with respect to the sensing electrodes 3 positioned in the selected area 8 is achieved in operation #2.

The above-described operation #2 also achieves touch sensing with respect to the selected area 8 with a high sensitivity, since multiple times of touch sensing are performed with respect to the sensing electrodes 3 positioned in the selected area 8 in each operation cycle. Additionally, the operation illustrated in FIGS. 11A and 11B, in which some but not all of the sensing circuits $6_1$ to $6_4$ are used for touch sensing in operation #2, effectively reduces the power consumption.

In the configurations of the touch panel device 10 illustrated in FIGS. 1, 7 and 9, the selected area 8 is fixedly defined by the fixed connections between the sensing electrodes 3 and the sensing circuits $6_1$ to $6_4$ (that is, the layout of the interconnections connected between the selectors $5_1$ to $5_4$ and the sensing electrodes 3 (or the external connection terminals 4). This implies that it is difficult to actively modify the selected area 8 in the configurations illustrated in FIGS. 1, 7 and 10.

Figure 12:
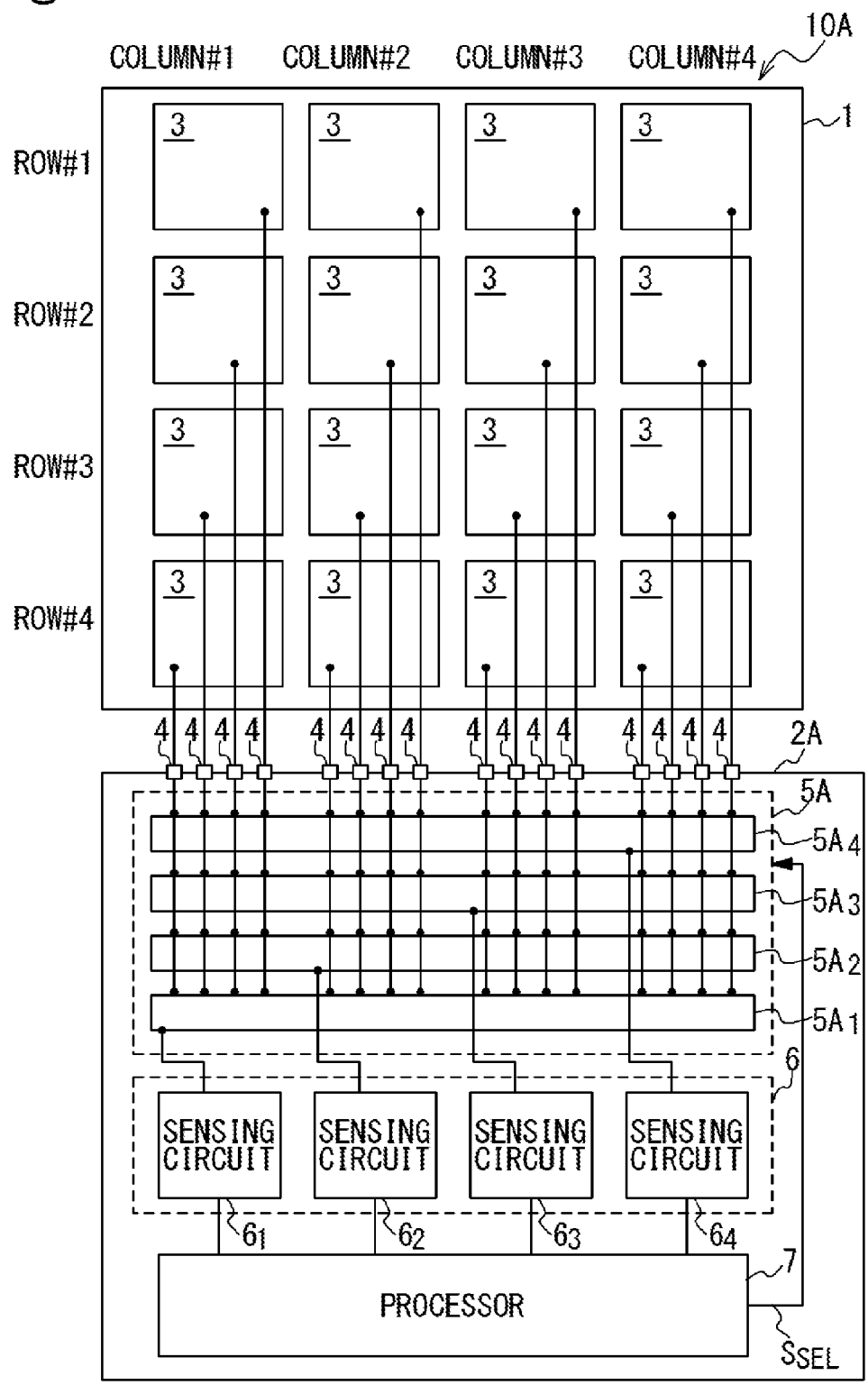
FIG. 12 is a block diagram schematically illustrating an example of the configuration of a touch panel device in another embodiment.

To actively modify the selected area 8, it would be preferable that the connections between the sensing electrodes 3 and the inputs of the sensing circuitry 6 (that is, the connections between the sensing electrodes 3 and the sensing circuits $6_1$ to $6_4$) can be switched. FIG. 12 is a block diagram schematically illustrating an exemplary configuration of a touch panel device 10A thus configured.

In the touch controller 2A of the touch panel device 10A illustrated in FIG. 12, a selector circuitry 5A is used which is configured differently from the selector circuitry 5 of the touch controller 2 illustrated in FIGS. 1, 7 and 9. The selector circuitry 5A is configured to electrically connect any of the sensing electrodes 3 provided in the touch panel 1 to any inputs of the sensing circuitry 6 (that is, the inputs of any of the sensing circuits $6_1$ to $6_4$) under the control of the control signal $S_{SEL}$.

More specifically, the selector circuitry 5 includes four selectors $5A_1$ to $5A_4$. Each of the selectors $5A_1$ to $5A_4$ is connected to all the sensing electrodes 3 integrated in the touch panel 1. The selector $5A_1$ is configured to be able to connect a selected one of the sensing electrodes 3 to the input of the sensing circuit $6_1$, and the selector $5A_2$ is configured to be able to connect a selected one of the sensing electrodes 3 to the input of the sensing circuit $6_2$. Correspondingly, the selector $5A_3$ is configured to be able to connect a selected one of the sensing electrodes 3 to the input of the sensing circuit $6_3$, and the selector $5A_4$ is configured to be able to connect a selected one of the sensing electrodes 3 to the input of the sensing circuit $6_4$.

The touch controller 2A configured as illustrated in FIG. 12 can connect any desired combination of the sensing electrodes 3 to the sensing circuits $6_1$ to $6_4$, which allows defining the selected area 8 including any desired combination of sensing electrodes 3 in operation #2, in which touch sensing is performed only with respect to the selected area 8. For example, the selected area 8 illustrated in FIG. 5 can be defined by electrically connecting the sensing electrodes 3 positioned in row #3, column #1, in row #3, column #2, in row #4, column #1 and in row #4, column #2 to the inputs of the sensing circuits $6_1$ to $6_4$, respectively, in operation #2. Also, the selected area 8 illustrated in FIG. 5 can be defined by electrically connecting the sensing electrodes 3 positioned in row #1, column #1, in row #1, column #2, in row #2, column #1 and in row #2, column #2 to the inputs of the sensing circuits $6_1$ to $6_4$, respectively, in phase PH1 of operation #2 and electrically connecting the sensing electrodes 3 positioned in row #3, column #1, in row #3, column #2, in row #4, column #1 and in row #4, column #2 to the inputs of the sensing circuits $6_1$ to $6_4$, respectively, in phase PH2 of operation #2.

Figure 13:
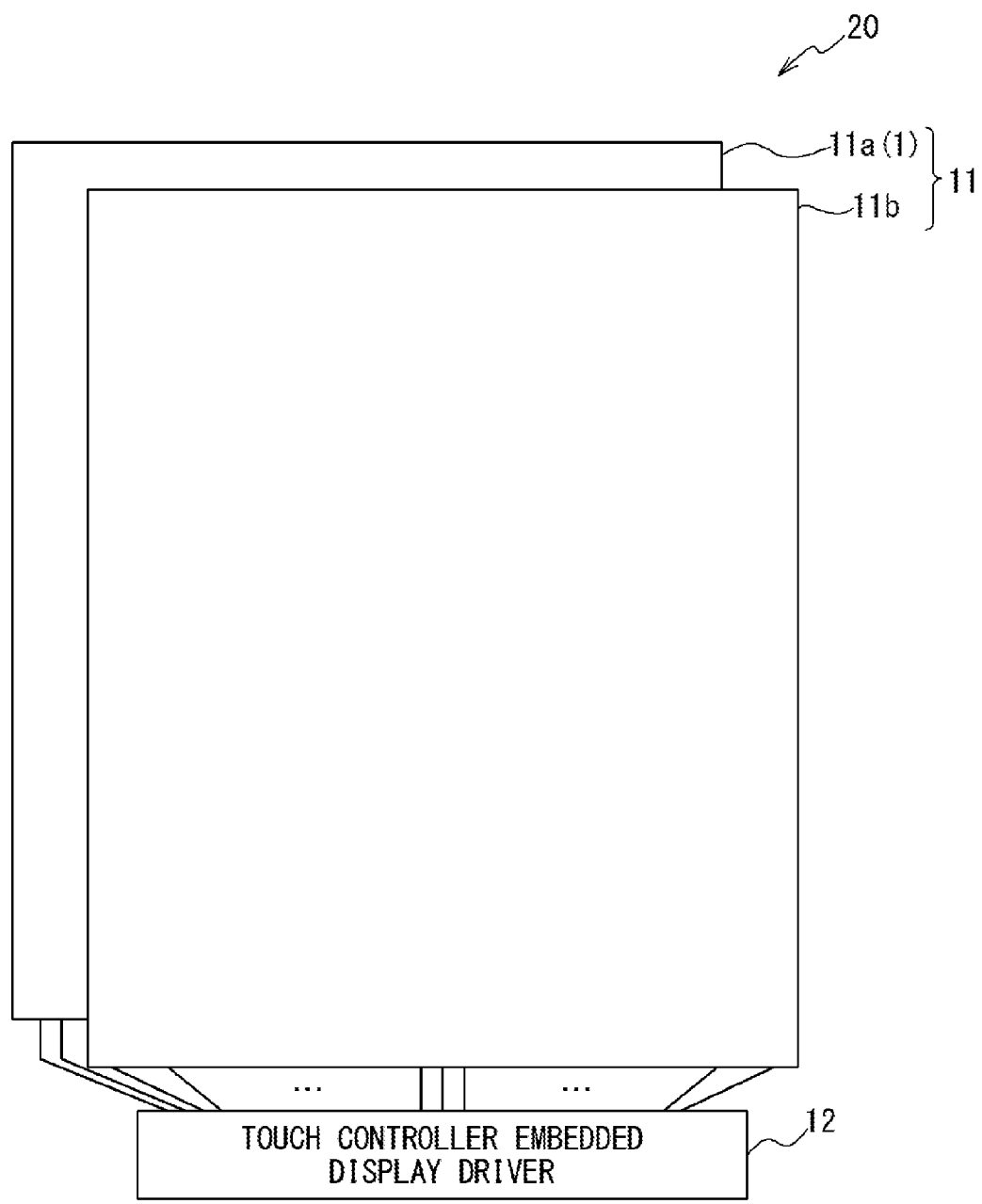
FIG. 13 is a block diagram schematically illustrating the configuration of a display system in which a touch panel is integrated within a liquid crystal display panel.

Next, a description is given of examples of implementation of the touch panel device (10, 10A) of the present embodiment. The touch panel device of the present embodiment may be applied to a display system in which a touch panel is integrated within a liquid crystal display panel. FIG. 13 is a block diagram illustrating an exemplary configuration of a display system 20 thus configured. The display system 20 includes a liquid crystal display panel 11 and a touch-controller-embedded display driver 12.

The liquid crystal display panel 11 includes an active matrix substrate 11a and a counter substrate 11b. The active matrix substrate 11a and a counter substrate 11b are opposed across an appropriate gap and the gap is filled with liquid crystal.

Integrated in the active matrix substrate 11a are source lines, gate lines, TFT selection transistors, pixel electrodes and counter electrodes. A GIP (gate-in-panel) circuit driving the gate lines may be additionally integrated in the active matrix substrate 11a.

In the display system 20 illustrated in FIG. 13, the active matrix substrate 11a is also used as the touch panel 1 in the above-described embodiments. The counter electrodes integrated in the active matrix substrate 11a is also used as the sensing electrodes 3. It should be noted that, when the counter electrodes are integrated in the counter substrate, the said counter electrodes may be used as the sensing electrodes 3.

Figure 14:
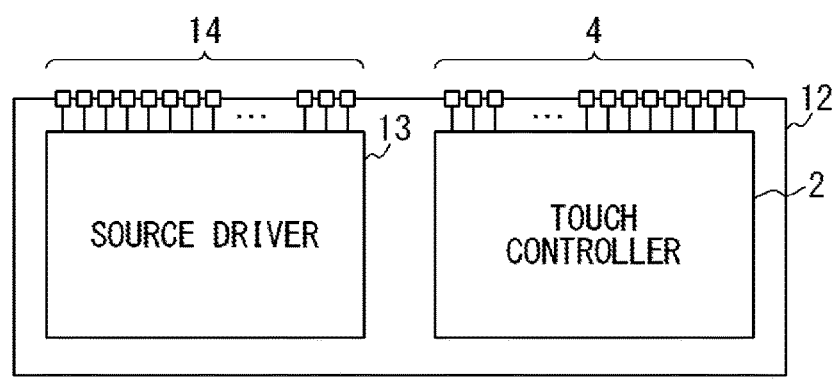
FIG. 14 is a block diagram schematically illustrating the configuration of a touch-controller-embedded display driver of the display system illustrated in FIG. 13.

The touch-controller-embedded display driver 12 has the function of driving the source lines integrated in the active matrix substrate 11a to display an image on the liquid crystal display panel 11 and also has the function of performing touch sensing by using the counter electrodes integrated in the active matrix substrate 11a as the sensing electrodes 3. FIG. 14 is a block diagram illustrating an exemplary configuration of the touch-controller-embedded display driver 12. The touch-controller-embedded display driver 12 includes external connection terminals 4 to be connected to the sensing electrodes 3 provided in the touch panel 1 (that is, the counter electrodes integrated in the active matrix substrate 11a) and source outputs to be connected to the source lines integrated in the active matrix substrate 11a. A touch controller 2 and a source driver 13 are integrated in the touch-controller-embedded display driver 12, monolithically (that is, integrated in the same semiconductor chip.) The configuration and operation of the touch controller 2 integrated in the touch-controller-embedded display driver 12 is as described above. The source driver 13 operates as a driver circuitry driving the source lines integrated in the active matrix substrate 11a.

The touch-controller-embedded display driver 12 may have the function of driving the gate lines integrated in the active matrix substrate 11a. Alternatively, when a GIP circuit is integrated in the active matrix substrate 11a, the touch-controller-embedded display driver 12 may supply control signals used for the control of the driving of the gate lines.

The display system 20 thus configured, in which the touch panel 1 is integrated within the liquid crystal display panel 11, has advantages of a reduced volume and a reduced number of components. Such feature is preferable especially for use in mobile terminals.

Figure 15:
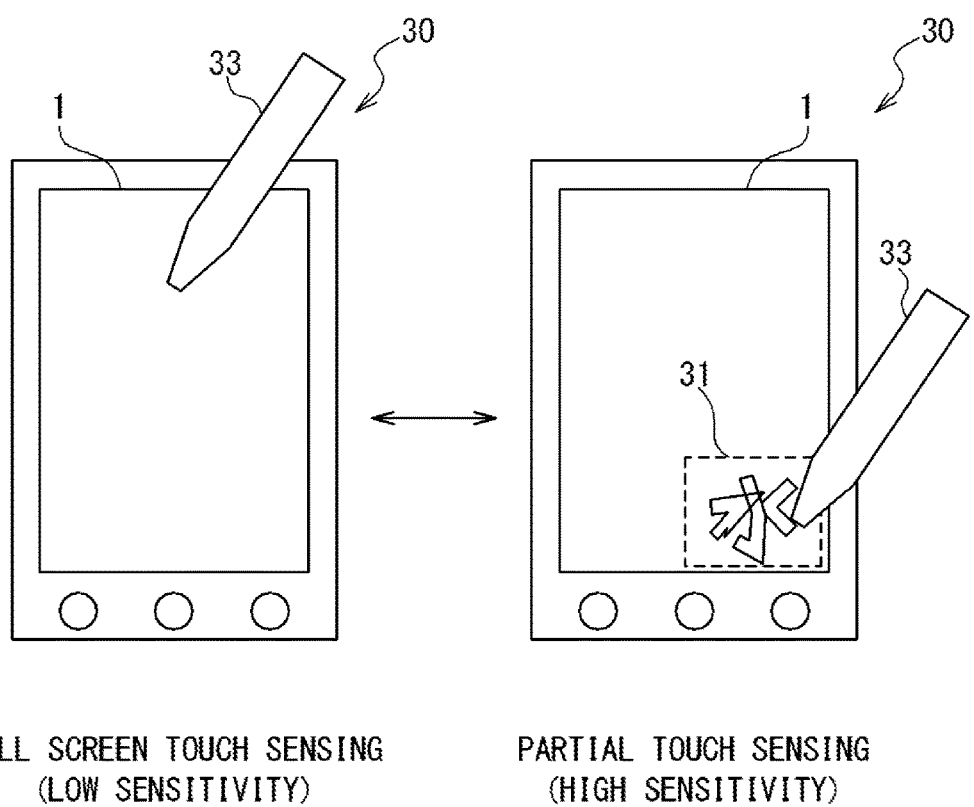
FIG. 15 is a diagram schematically illustrating one example of a preferred operation of a display system when the touch panel device of the present embodiment is applied to the display system.

Next, a description is given of exemplary applications in the case when the touch panel device (10, 10A) of the present embodiment is applied to a display system including a display panel and a touch panel (such as the display system 20 illustrated in FIGS. 13 and 14). FIG. 15 is a diagram schematically illustrating an example of a preferred operation in the case when the touch panel device (10, 10A) of the present embodiment is applied to a display system 30.

In one embodiment, as illustrated in FIG. 15, touch sensing with respect to the entire area of the touch panel 1 (hereinafter, referred to as the "full-screen touch sensing") and touch sensing with respect to a partial area of the touch panel 1 (hereinafter, referred to as the "partial touch sensing") are implemented with a given ratio of frequencies. In the partial touch sensing, touch sensing is performed only with respect to a touch input area 31 of the touch panel 1. The touch input area 31 is an area provided for accepting touch manipulation by the user. The partial touch sensing can be achieved by selecting the touch input area 31 as the above-described selected area 8, that is, performing touch sensing with respect to the sensing electrodes 3 provided in the touch input area 31.

When the touch input area 31 is intended to accept touch manipulation with a stylus 33, for example, the touch manipulation with the stylus 33 can be detected more reliably by performing touch sensing with respect to the touch input area 31 with a high sensitivity. To perform touch sensing of the touch input area 31 with a high sensitivity while allowing detection of tough manipulation upon the area other than the touch input area 31 of the touch panel 1, it is preferable that the full-screen touch sensing is performed with a relatively low frequency and the partial touch sensing is performed with a relatively high frequency. When operation sequences are repeatedly performed, in each of which the above-described operation #2 is performed in N operation cycles for N being a natural number more than one with the touch input area 31 selected as the above-described selected area 8 and the above-described operation #1 is performed in one operation cycle, for example, this allows performing the full-screen touch sensing with a relatively low frequency and performing the partial touch sensing with a relatively high frequency.

Figure 16:
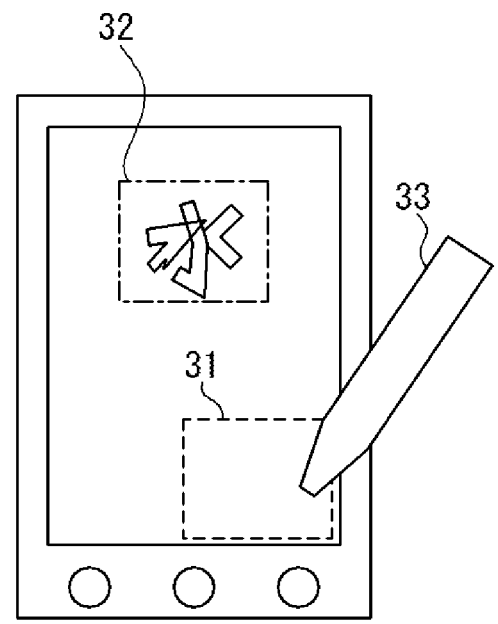
FIG. 16 is a diagram schematically illustrating another example of a preferred operation of a display system when the touch panel device of the present embodiment is applied to the display system.

In the case when the above-described operation is performed, an image element reflecting the touch manipulation upon the touch input area 31 may be displayed in an area other than the touch input area 31. For example, as illustrated in FIG. 16, an image element reflecting a touch manipulation upon the touch input area 31 may be displayed in an image reflecting area 32 defined in the touch panel 1 separately from the touch input area 31.

Figure 17:
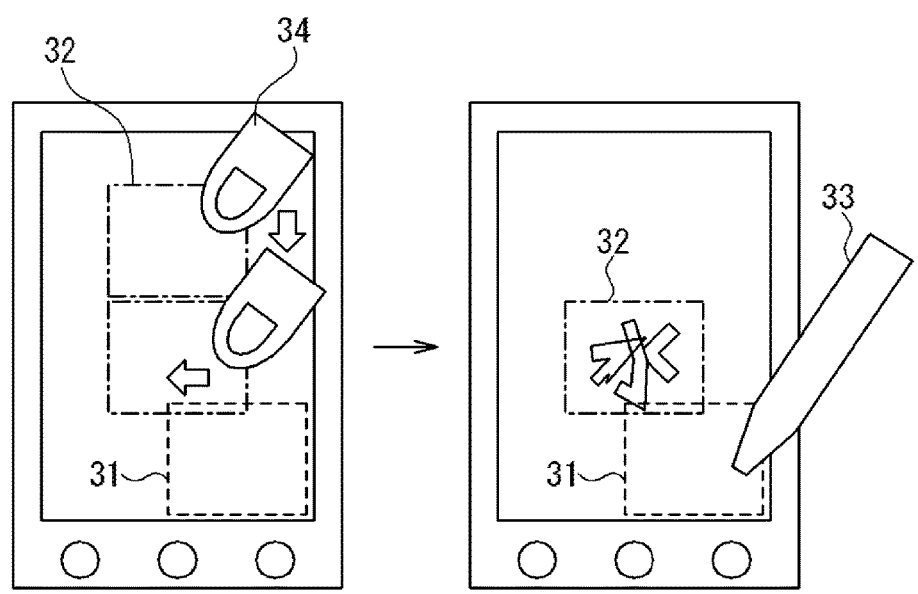
FIG. 17 is a diagram schematically illustrating still another example of a preferred operation of a display system when the touch panel device of the present embodiment is applied to the display system.

In one embodiment, as illustrated in FIG. 17, the image reflecting area 32 may be moved in response to a touch manipulation. For example, when an event in which a hold-down of a finger 34 against the image reflecting area 32 is detected (such a touch manipulation can be detected by detecting a fact that a conductor is in contact with the image reflecting area 32 for a long time with a wide area), the system is placed into a mode in which the image reflecting area 32 can be moved. This is followed by detecting a touch manipulation upon the touch panel 1 with full-screen touch sensing, and moving the image reflecting area 32 in response to the detected touch manipulation.

Figure 18:
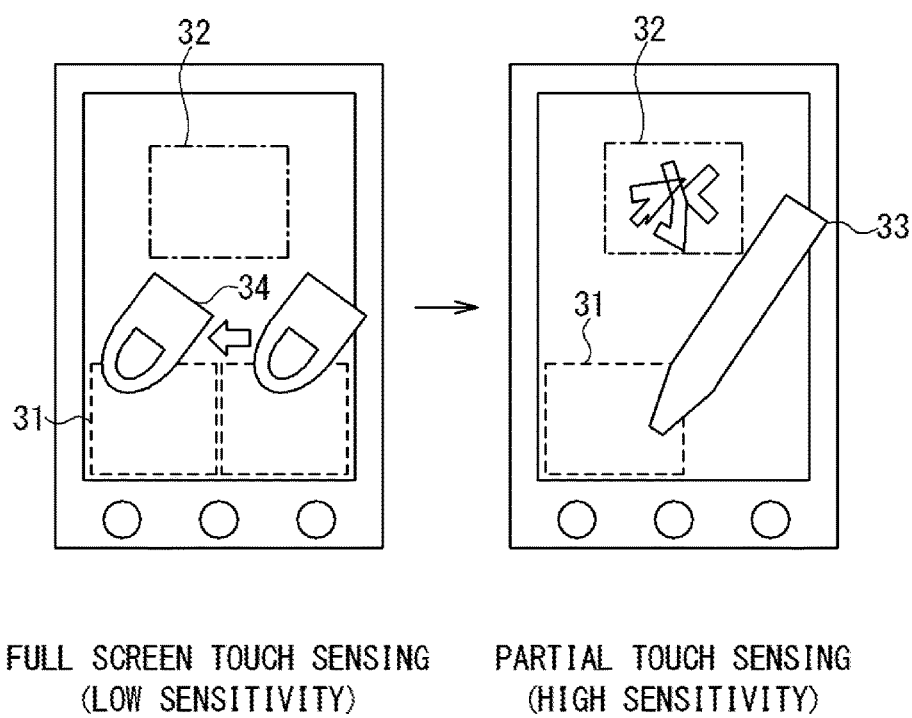
FIG. 18 is a diagram schematically illustrating still another example of a preferred operation of a display system when the touch panel device of the present embodiment is applied to the display system.

In another embodiment, as illustrated in FIG. 18, the touch input area 31 may be moved in response to a touch manipulation. For example, when an event in which a hold-down of a finger 34 against the touch input area 31 is detected, the system is placed into a mode in which the touch input area 31 can be moved. This is followed by detecting a touch manipulation against the touch panel 1 with full-screen touch sensing, and moving the touch input area 31 in response to the detected touch manipulation. Thereafter, the partial touch sensing is performed with respect to the moved touch input area 31. The configuration of the touch panel device 10A illustrated in FIG. 12, in which the selected area 8 can be defined at a desired position of the touch panel 1, is suitably adapted to movement of the touch input area 31.

Although various embodiments of the present disclosure have been specifically described in the above, the present invention must not be construed as being limited to the above-described embodiments. It would be apparent to a person skilled in the art that the present invention may be implemented with various modifications.

What is claimed is:

1. A touch panel device, comprising:
   a touch panel including a plurality of sensing electrodes arrayed in rows and columns;
   selector circuitry comprising a plurality of selectors respectively associated with the columns of the plurality of sensing electrodes;
   sensing circuitry configured to generate sensed signals having signal levels depending on self-capacitances of the plurality of sensing electrodes, wherein each of the plurality of selectors is configured to selectively connect the plurality of sensing electrodes positioned in the associated column to the sensing circuitry; and
   a processor configured to perform touch sensing of the touch panel, based on the sensed signals,
   wherein, when the touch panel device is placed in a first state, the selector circuitry operates to electrically connect first sensing electrodes selected from the plurality of sensing electrodes to the sensing circuitry in each operation cycle which has a given time duration,
   wherein, when the touch panel device is placed in a second state, the selector circuitry operates to electrically connect second sensing electrodes selected from the plurality of sensing electrodes to the sensing circuitry during each operation cycle, wherein at least one of the plurality of selectors is configured to connect at least one of the plurality of sensing electrodes which is positioned in one of the columns other than the associated column, in addition to the plurality of sensing electrodes positioned in the associated column, to the sensing circuitry, thereby permitting the second sensing electrodes to include multiple electrodes in the same row and the same column, wherein the second sensing electrodes includes multiple electrodes in the same row and the same column that are coupled to respective sensing circuits in parallel.

2. The touch panel device according to claim 1, wherein a number of the second sensing electrodes connected to the sensing circuitry during each operation cycle when the touch panel device is placed in the second state is less than a number of the first sensing electrodes connected to the sensing circuitry during each operation cycle when the touch panel device is placed in the first state, wherein, when the touch panel device is placed in the second state, touch sensing is performed a plurality of times with respect to each of the second sensing electrodes during each operation cycle.

3. The touch panel device according to claim 2, wherein, when the touch panel device is placed in the first state, touch sensing is performed once with respect to the plurality of sensing electrodes during each operation cycle.

4. The touch panel device according to claim 1, wherein the plurality of sensing electrodes are arrayed in rows and columns in the touch panel,
   wherein, when the touch panel device is placed in the first state, during each operation cycle, the selector circuitry sequentially selects the rows of the plurality of sensing electrodes, and electrically connects sensing electrodes in a selected one of the rows of the plurality of sensing electrodes to the sensing circuitry at a same time, and
   wherein, when the touch panel device is placed in the second state, the selector circuitry electrically connects selected ones of the second sensing electrodes which are positioned in multiple rows at the same time to the sensing circuitry.

5. The touch panel device according to claim 1, wherein the sensing circuitry includes the respective sensing circuits,
   wherein the selector circuitry is configured to electrically connect any one of the plurality of sensing electrodes to any one of the respective sensing circuits, and
   wherein each of the respective sensing circuits is configured to generate a sensed signal having a signal level depending on a self-capacitance of a sensing electrode connected thereto.

6. The touch panel device according to claim 5, wherein the selector circuitry includes a plurality of selectors respectively associated with the respective sensing circuits, and
   wherein each of the plurality of selectors is configured to electrically connect any one of the plurality of sensing electrodes to an associated one of the respective sensing circuits.

7. The touch panel device according to claim 1, wherein the selector circuitry, sensing circuitry, and processor are part of a discrete integrated circuit.

8. A touch controller for performing touch sensing with respect to a touch panel including a plurality of sensing electrodes arrayed in rows and columns, the touch controller comprising:
   a plurality of external connection terminals to be connected to the plurality of sensing electrodes, respectively;
   selector circuitry comprising a plurality of selectors respectively associated with the columns of the plurality of sensing electrodes;
   sensing circuitry configured to generate sensed signals having signal levels depending on self-capacitances of the plurality of sensing electrodes, wherein each of the plurality of selectors is configured to selectively connect the plurality of sensing electrodes positioned in the associated column to the sensing circuitry; and
   a processor configured to perform touch sensing of the touch panel, based on the sensed signals,
   wherein, when the touch controller is placed in a first state, the selector circuitry operates to electrically connect first sensing electrodes selected from the plurality of sensing electrodes to the sensing circuitry during each operation cycle which has a given time duration,
wherein, when the touch controller is placed in a second state, the selector circuitry operates to electrically connect second sensing electrodes selected from the plurality of sensing electrodes to the sensing circuitry, wherein at least one of the plurality of selectors is configured to connect at least one of the plurality of sensing electrodes which is positioned in one of the columns other than the associated column, in addition to the plurality of sensing electrodes positioned in the associated column, to the sensing circuitry, thereby permitting the second sensing electrodes to include multiple electrodes in the same row and the same column, wherein the second sensing electrodes includes multiple electrodes in the same row and the same column that are coupled to respective sensing circuits in parallel.

9. The touch controller according to claim 8, wherein the plurality of sensing electrodes are arrayed in rows and columns in the touch panel,
wherein when the touch panel is placed in the first state, during each operation cycle, the selector circuitry sequentially selects the rows of the plurality of sensing electrodes, and electrically connects sensing electrodes in a selected one of the rows of the plurality of sensing electrodes to the sensing circuitry at the same time,
wherein, when the touch panel is placed in the second state, the selector circuitry electrically connects selected ones of the second sensing electrodes which are positioned in multiple rows at the same time to the sensing circuitry.

10. The touch controller according to claim 8, wherein the sensing circuitry includes the respective sensing circuits,
wherein the selector circuity is configured to electrically connect any one of the plurality of sensing electrodes to any one of the respective sensing circuits, and
wherein each of the respective sensing circuits is configured to generate a sensed signal having a signal level depending on a self-capacitance of a sensing electrode connected thereto.

11. The touch controller according to claim 8, wherein the plurality of external connection terminals, selector circuitry, sensor circuitry, and processor are part of a discrete integrated circuit.

12. The touch controller according to claim 8, wherein a number of the second sensing electrodes connected to the sensing circuitry during each operation cycle when the touch panel is placed in the second state is less than a number of the first sensing electrodes connected to the sensing circuitry during each operation cycle when the touch panel is placed in the first state, wherein, when the touch controller is placed in the second state, touch sensing is performed a plurality of times with respect to each of the second sensing electrodes during each operation cycle.

13. The touch controller according to claim 12, wherein, when the touch controller is placed in the first state, touch sensing is performed once with respect to the plurality of sensing electrodes during each operation cycle.

14. A touch sensing method for performing touch sensing of a touch panel including a plurality of sensing electrodes arrayed in rows and columns in a touch panel device, the method comprising:
performing selected one of first and second operations during each operation cycle having a given time duration,
wherein the first operation comprises:
electrically connecting first sensing electrodes selected from the plurality of sensing electrodes to a sensing circuitry by a selector circuitry of the touch panel device, wherein the selector circuitry comprises a plurality of selectors respectively associated with the columns of the plurality of sensing electrodes;
by the sensing circuitry, generating first sensed signals having signal levels depending on self-capacitances of the first sensing electrodes, wherein each of the plurality of selectors is configured to selectively connect the plurality of sensing electrodes positioned in the associated column to the sensing circuitry; and
performing touch sensing with respect to the first sensing electrodes, based on the first sensed signals,
wherein the second operation comprises:
electrically connecting second sensing electrodes selected from the plurality of sensing electrodes to the sensing circuitry by the selector circuitry, wherein at least one of the plurality of selectors is configured to connect at least one of the plurality of sensing electrodes which is positioned in one of the columns other than the associated column, in addition to the plurality of sensing electrodes positioned in the associated column, to the sensing circuitry, thereby permitting the second sensing electrodes to include multiple electrodes in the same row and the same column, wherein the second sensing electrodes includes multiple electrodes in the same row and the same column that are coupled to respective sensing circuits in parallel;
by the sensing circuitry, generating second sensed signals having signal levels depending on self-capacitances of connected ones of the second sensing electrodes, the second sensing electrodes being connected to the sensing circuitry; and
performing touch sensing with respect to the second sensing electrodes, based on the second sensed signals.

15. The touch sensing method according to claim 14, wherein a frequency at which the second operation is performed is higher than that at which the first operation is performed.

16. The touch sensing method according to claim 14, wherein a number of the second sensing electrodes connected to the sensing circuitry during each operation cycle when the second operation is performed is less than a number of the first sensing electrodes connected to the sensing circuitry during each operation cycle when the first operation is performed, wherein touch sensing is performed a plurality of times with respect to each of the second sensing electrodes during the second operation.

17. The touch sensing method according to claim 16, wherein touch sensing is performed once with respect to the plurality of sensing electrodes during the first operation.

18. The touch sensing method according to claim 14, wherein the touch sensing method is performed using a touch controller embodied in a single integrated circuit.

* * * * *